United States Patent
Nagata et al.

(10) Patent No.: US 8,432,353 B2
(45) Date of Patent: Apr. 30, 2013

(54) INFORMATION DISPLAY DEVICE

(75) Inventors: Takayuki Nagata, Osaka (JP); Tatsuo Itoh, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 739 days.

(21) Appl. No.: 12/602,710

(22) PCT Filed: Mar. 31, 2009

(86) PCT No.: PCT/JP2009/001481
§ 371 (c)(1),
(2), (4) Date: Dec. 2, 2009

(87) PCT Pub. No.: WO2009/122716
PCT Pub. Date: Oct. 8, 2009

(65) Prior Publication Data
US 2010/0177025 A1 Jul. 15, 2010

(30) Foreign Application Priority Data
Apr. 3, 2008 (JP) .................................. 2008-096845

(51) Int. Cl.
G09G 3/36 (2006.01)
(52) U.S. Cl.
USPC ......................................... 345/102; 362/611
(58) Field of Classification Search .............. 349/61–71; 362/600–634; 345/102
See application file for complete search history.

(56) References Cited

U.S. PATENT DOCUMENTS

| | | | |
|---|---|---|---|
| 6,137,556 A * | 10/2000 | Yamahara | 349/136 |
| 6,278,540 B1 * | 8/2001 | Wang | 359/245 |
| 6,690,348 B2 | 2/2004 | Sato et al. | |
| 6,762,743 B2 * | 7/2004 | Yoshihara et al. | 345/102 |
| 2002/0080105 A1 | 6/2002 | Sato et al. | |
| 2006/0022921 A1 | 2/2006 | Miyake et al. | |
| 2007/0263409 A1 * | 11/2007 | Mok | 362/612 |
| 2008/0079866 A1 * | 4/2008 | Mimura et al. | 349/61 |

FOREIGN PATENT DOCUMENTS

| | | |
|---|---|---|
| CN | 1862340 | 11/2006 |
| JP | 61-138089 | 8/1986 |
| JP | 9-236785 | 9/1997 |
| JP | 10-68948 | 3/1998 |
| JP | 2000-122085 | 4/2000 |

(Continued)

OTHER PUBLICATIONS

International Search Report issued Jul. 7, 2009 in International (PCT) Application No. PCT/JP2009/001481.

*Primary Examiner* — Latanya Bibbins
(74) *Attorney, Agent, or Firm* — Wenderoth, Lind & Ponack, L.L.P.

(57) ABSTRACT

An information display device (10) includes a light source (11), a light guide plate (13) to which light from the light source (11) enters from a side surface and from which the light exits from one principal surface, and a liquid crystal panel (16) disposed adjacently to the light guide plate (13). Outside light is injected into the light guide plate (13) from an opposing surface opposing the one principal surface. The light guide plate (13) includes a light control mirror (19) electrically switchable to transmit light and to reflect light. At least one of the light from the light source (11) and the outside light exits from the one principal surface of the light guide plate (13). The light passes through the liquid crystal panel (16) and a character or an image is displayed.

16 Claims, 10 Drawing Sheets

FOREIGN PATENT DOCUMENTS

| | | |
|---|---|---|
| JP | 2000-221324 | 8/2000 |
| JP | 2002-202490 | 7/2002 |
| JP | 2006-39298 | 2/2006 |
| WO | WO 2006109931 A1 * | 10/2006 |

* cited by examiner

INFORMATION DISPLAY DEVICE

TECHNICAL FIELD

The present invention relates to a thin information display device capable of making use of back light.

BACKGROUND ART

An information display device in recent years is becoming increasingly larger and thinner and used in a wide range from a compact portable electronic device to a large-scaled digital sinage display, such as an electronic whiteboard and an electronic poster. For these information display devices, lower power consumption is also required. To this end, besides a technique to improve light use efficiency of devices, a variety of techniques to make use of outside light, such as sunlight, have been devised.

As one of these information devices, there has been proposed a liquid crystal display configured to display an image using a backlight in dark surroundings and to illuminate by admitting front light from the viewing side as outside light when the outside light is sufficiently bright (see, for example, Patent Documents 1 and 2). These liquid crystal displays reduce power consumption while maintaining a satisfactory image display by providing a lighting window portion formed of a movable shielding plate or a liquid crystal element above the image display portion and controlling an amount of admitted front light by electrically controlling light transmittance of the lighting window portion.

Also, as another example of the information display device making use of outside light, there is a semi-transmissive liquid crystal display that makes use of both reflection of front light from the viewing side and a backlight as the light source, and reflectance of front light from the viewing side and transmittance of the backlight are adjusted in response to the ambient brightness (for example, Patent Document 3). This liquid crystal display reduces power consumption while maintaining a satisfactory image display by inserting liquid crystal light control glass between the backlight and the liquid crystal panel and by adjusting transmittance of the liquid crystal light control glass. Window glass using such liquid crystal light control glass and thereby capable of changing an amount of admitted outside light is also proposed.

Also, there is an example where a transmissive liquid crystal panel without a backlight is laminated to window glass so that an image is displayed using outside light from the back surface (for example, Patent Document 4). Besides the use for an image display, the transmissive liquid crystals are also available as a blind that shields transmitted light. As an example to apply such window glass to a display, there is an expectation that such window glass is applied to a head up display that shows information, for example, on the windshield of an automobile.

The conventional examples described above, however, have a problem that the capability is not fully exerted when the window glass is used as a display. For example, the information display devices described in Patent Documents 1 and 2 have a problem that even when a light source sufficiently bright as a backlight can be prepared, a sufficient amount of light cannot be obtained because the lighting window portion to admit front light from the viewing side is smaller than the screen size.

Also, because the information display device described in Patent Document 3 makes use of front light on the viewing side, in a case where it is used for the window, for example, for a house or an automobile, there is a problem that no matter how bright the outside of the room may be, outside light cannot be utilized effectively when the inside of the room on the viewing side is dark.

In addition, the information display devices described in Patent Documents 1 through 3 fail to teach or suggest the configuration to turn the display panel to transparent when the information display devices are used as a normal window to admit desired outside light.

Further, not only is the information display device described in Patent Document 4 capable of displaying an image by making use of outside light, but also it can be used as a normal window with the capability of controlling the outside light. There is, however, a problem that this information display device cannot be used in the absence of outside light.

Patent Document 1: JP-A-2006-39298
Patent Document 2: JP-A-10-68948
Patent Document 3: JP-A-2000-122085
Patent Document 4: JP-UM-A-61-138089

DISCLOSURE OF THE INVENTION

An object of the invention is to provide an information display device that reduces power consumption by making use of outside light irradiated from the back surface in a configuration in which window glass is used as a display.

An information display device according to one aspect of the invention includes a light source, a liquid crystal panel formed by encapsulating liquid crystals between two base materials, and an illumination light selection member disposed in an optical path between the light source and the liquid crystal panel and configured in such a manner that back light enters therein from a back surface. The illumination light selection member illuminates a back surface of the liquid crystal panel with at least one of light that is light from the light source reflected on the illumination light selection member and light that is the back light having passed through the illumination light selection member.

In the information display device described above, the illumination light selection member illuminates the back surface of the liquid crystal panel using at least one of light that is light from the light source reflected on the illumination light selection member and light that is the back light having passed through the illumination light selection member. It thus becomes possible to reduce power consumption by making use of the outside light irradiated from the back surface.

BEST MODE FOR CARRYING OUT THE INVENTION

Figure 1:
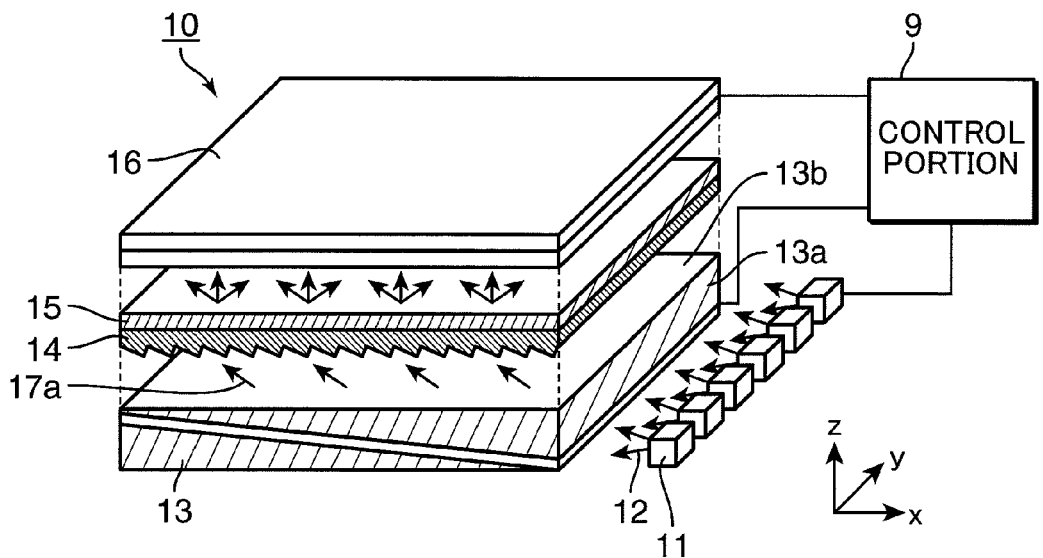
FIG. 1 is a perspective view schematically showing the overall configuration of an information display device according to a first embodiment of the invention.

Hereinafter, embodiments of the invention will be described with reference to the drawings. Like components are labeled with like reference numerals and descriptions of such components are omitted where appropriate. Also, for ease of understanding, the respective components are chiefly illustrated in schematic forms and may not represent exact shapes.

First Embodiment

Figure 2:
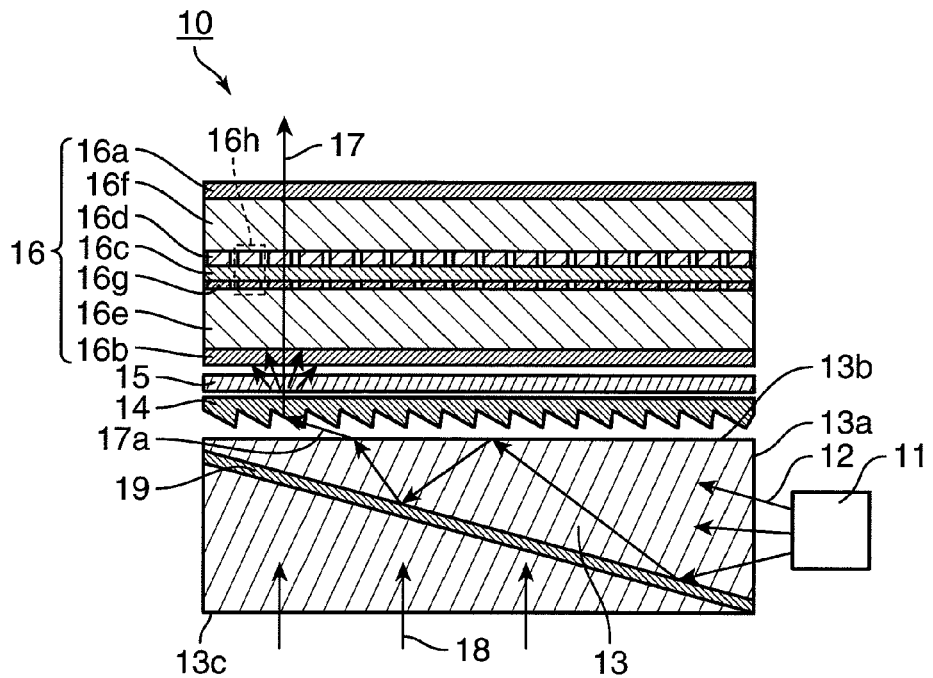
FIG. 2 is a cross section in an x-z plane of a major portion of the information display device shown in FIG. 1.

FIG. 1 and FIG. 2 are views schematically showing the configuration of an information display device according to a first embodiment of the invention. FIG. 1 is a perspective view schematically showing the overall configuration of the information display device according to the first embodiment of the invention. FIG. 2 is a cross section in an x-z plane of a major portion of the information display device shown in FIG. 1.

As are shown in FIG. 1 and FIG. 2, an information display device 10 of this embodiment includes a plurality of LED light sources 11 provided so that the light emitting portions are arrayed in line, a light guide plate 13 to which rays of illumination light 12 emitted from a plurality of the LED light sources 11 enter from a side surface 13a and from which rays of the illumination light 12 exit from one principal surface 13b, a prism sheet 14 and a diffusing sheet 15 that adjust an exiting angle distribution of exiting light 17 exiting from the light guide plate 13 to a predetermined distribution, a liquid crystal panel 16, and a control portion 9 that controls a plurality of the LED light sources 11, a light control mirror 19 in the light guide plate 13, and the liquid crystal panel 16.

Herein, as is shown in FIG. 2, the light guide plate 13 is configured in such a manner that it admits outside light 18, which is back light, from the back surface, that is, an opposing surface 13c opposing the principal surface 13b. It is made, for example, of optical plastics so that it is transparent to the illumination light 12 and the outside light 18. Further, the light guide plate 13 includes the light control mirror 19 that is disposed inside at a predetermined angle with respect to the optical axis of the illumination light 12 and the outside light 18.

The light control mirror 19 is disposed so as to tilt at a predetermined angle with respect to the principal surface 13b of the light guide plate 13 and it is a mirror switchable between a transparent state (a state where it transmits the outside light 18) and a state where it reflects the illumination light 12 with an application of a predetermined voltage by the control portion 9. The light control mirror 19 is formed, for example, by layering indium tin oxide (ITO) serving as a transparent electrode, tungsten oxide ($WO_3$) serving as an ion storage layer, tantalum oxide ($Ta_2O_5$) serving as an electrolyte layer, aluminum (Al) serving as a buffer layer, palladium (Pd) serving as a catalyst layer, and a magnesium and nickel (Mg and Ni) alloy thin film serving as a light control mirror layer.

With the light control mirror 19 configured as above, hydrogen ions ($H^+$) are stored in the ion storage layer ($H_xWO_3$) in a mirror state (a state where it reflects the illumination light 12). When a voltage of about 5 volts is applied, it turns to transparent because the hydrogen ions ($H^+$) migrate into the light control mirror layer (Mg—Ni alloy in a metal state) and the Mg—Ni alloy in a metal state is hydrogenated and turns to a non-metal state. When the polarity is reversed and a voltage of about −5 volts is applied, the hydrogen ions return into the ion storage layer ($WO_3$) and the light control mirror layer returns to the original mirror (metal) state. These changes are completed in about ten seconds and once the state has changed, the changed state is maintained even when electricity is turned off.

The liquid crystal panel 16 is formed of a transparent electrode 16g, a liquid crystal layer 16c, and a color filter 16d sandwiched between a pair of glass plates 16e and 16f, which are further sandwiched between polarization plates 16a and 16b from the both sides. Filter portions for red, green, and blue are formed in a matrix fashion in the color filter 16d. The transparent electrode 16g, the liquid crystal layer 16c, and the color filter 16d in portions corresponding to the each filter portion together form a pixel 16h.

An operation of the information display device 10 of the first embodiment configured as above will now be described concretely.

An operation in a case where information is displayed using the LED light sources 11 will be described first. As are shown in FIG. 1 and FIG. 2, because a plurality of the LED light sources 11 are disposed in line along the side surface 13a of the light guide plate 13, rays of the illumination light 12 emitted from the respective LED light sources 11 enter into the light guide plate 13 homogeneously from the side surface 13a. In this instance, when the control portion 9 switches the light control mirror 19 to a mirror state, the illumination light 12 entering into the light guide plate 13 propagates within the light guide plate 13 while being repetitively reflected between the principal surface 13b and the light control mirror 19. In this instance, the outside light 18 is reflected on the light guide mirror 19 and is not allowed to pass through the light guide plate 13.

Herein, the reflection on the principal surface 13b is total reflection caused by a difference in refractive index between the light guide plate 13 and the outside (air). For example, given that the refractive index of the light guide plate 13 is 1.49, which is the same as the refractive index of acrylic, then the critical angle is about 42°. The illumination light 12 that propagates while being repetitively reflected between the principal surface 13b and the light control mirror 19 changes the travel direction each time it is reflected on the light control mirror 19 because of the tilt of the light control mirror 19 and the travel direction gradually approximates to a direction perpendicular to the principal surface 13b. The illumination light 12 is eventually past the critical angle and ejected from the principal surface 13b as exiting light 17a.

In this instance, the illumination light 12 propagating within the light guide plate 13 exits immediately when it is past the critical angle at the principal surface 13b. Accordingly, the exiting light 17a is ejected with directivity in a direction tilted with respect to the principal surface 13b. Subsequently, the travel direction of the exiting light 17a is changed to a direction substantially perpendicular to the light guide plate 13 by the prism sheet 14. Thereafter, the light whose travel direction is changed to the substantially perpendicular direction is diffused by the diffusing sheet 15 so that it enters into the liquid crystal panel 16 with spread of a predetermined angle about the vertical axis. In this manner, the exiting light 17 that has been diffused homogeneously passes through the liquid crystal panel 16 and a satisfactory color image is displayed.

Also, because the light control mirror 19 is disposed with a tilt at a predetermined angle with respect to the principal surface 13b of the light guide plate 13, even when a diverging ray enters into the light guide plate 13, the light control mirror 19 makes it possible to eject light with high directivity in a direction tilted with respect to the principal surface of the light guide plate 13. Also, when this configuration is combined with the prism sheet 14, it becomes possible to achieve an information display device capable of displaying output light with high directivity in a predetermined direction. Hence, by displaying information effectively in a particular direction alone, power consumption can be reduced.

Meanwhile, when the control portion 9 turns off the LED light sources 11 to switch the light control mirror 19 to a transparent state, the outside light 18 passes through the light guide plate 13 and exits from the principal surface 13b as the exiting light 17. The exiting light 17 passes through the prism sheet 14 and is diffused by the diffusing sheet 15. In this manner, the exiting light 17 that has been diffused homogeneously passes through the liquid crystal panel 16 and a color image is displayed.

As has been described, the information display device 10 of this embodiment is capable of using light from the LED light sources 11, which is an internal light source of the device, and the outside light 18 while switching between the former and the latter when a color image is displayed. It is therefore possible to achieve a thin information display device capable of switching between the internal light source and the outside light. By disposing the information display device 10, for example, to a window portion (for example, a window or glass) through which sunlight is admitted, information can be displayed without using the internal light source when the outside light during daytime is bright. It thus becomes possible to reduce power consumption.

Herein, the color filter 16d is preferably a color filter that transmits infrared light. For example, it is desirable to use an interference filter formed of a dielectric multi-layer film. This color filter has a reflection structure formed of a periodical structure in which films having different refractive indices are layered alternately and a defective layer that breaks the periodical structure in every predetermined region of the color filter is formed by a method of changing a film thickness in part in the periodical structure, so that light having a wavelength corresponding to the defective layer in each region is allowed to pass through the corresponding region.

Contrary to a conventionally used absorptive color filter that absorbs infrared light as well, the color filter formed of the interference filter described above can transmit infrared light. Accordingly, by allowing the outside light to pass through or shielding the outside light using the light control mirror 19, it becomes possible to regulate the temperature in a room by regulating an amount of infrared light contained in the outside light.

In this embodiment, the exiting angle distribution of the exiting light 17 is adjusted using the prism sheet 14 and the diffusing sheet 15. It should be appreciated, however, that these sheets can be replaced with sheets that can be turned to transparent.

Second Embodiment

Figure 3:
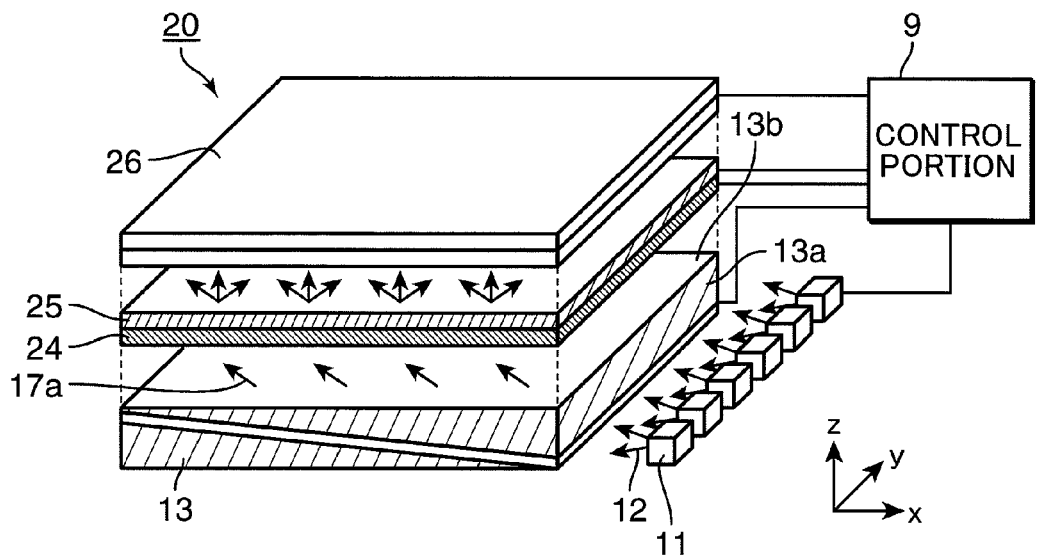
FIG. 3 is a perspective view schematically showing the overall configuration of an information display device according to a second embodiment of the invention.
Figure 4:
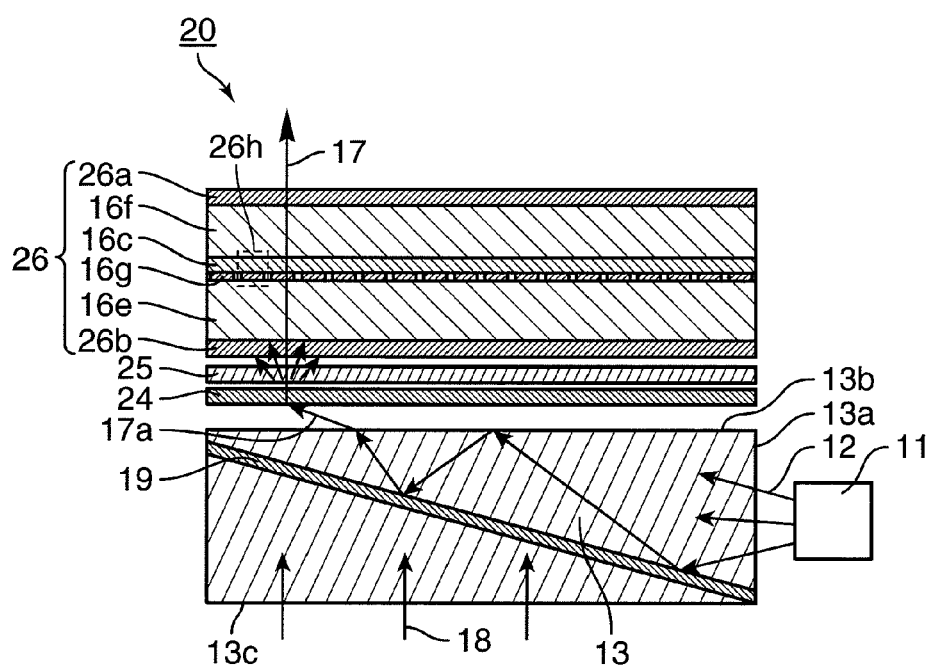
FIG. 4 is a cross section in an x-z plane of a major portion of the information display device shown in FIG. 3.

FIG. 3 and FIG. 4 are views schematically showing the configuration of an information display device according to a second embodiment of the invention. FIG. 3 is a perspective view schematically showing the overall configuration of the information display device according to the second embodiment of the invention. FIG. 4 is a cross section in an x-z plane of a major portion of the information display device shown in FIG. 3.

Referring to FIG. 3 and FIG. 4, an information display device 20 is different from the information display device 10 shown in FIG. 1 and FIG. 2 in that an electro-optical prism 24 and light control liquid crystals 25 are used instead of the prism sheet 14 and the diffusing sheet 15 and that a transparent liquid crystal panel 26 is used instead of the liquid crystal panel 16. Components other than those specified above are the same as the counterparts.

Herein, the electro-optical prism 24 is configured to be switchable to function as a transparent sheet and as a prism sheet with an application of a predetermined voltage by the control portion 9. The light control liquid crystals 25 are configured to be switchable to function as a transparent sheet and as a diffusing sheet with an application of a predetermined voltage by the control portion 9.

Also, a color filter is omitted from the liquid crystal panel 26 and the liquid crystal panel 26 is formed of the transparent electrode 16g and the liquid crystal layer 16c sandwiched between a pair of the glass plates 16e and 16f, which are further sandwiched between polarization plates 26a and 26b from the both sides. The transparent electrode 16g is formed in a predetermined pattern for each pixel and the transparent electrode 16g and the liquid crystal layer 16c in portions corresponding to each pattern together form a pixel 26h. Further, the polarization plates 26a and 26b are configured to be normally white and they are configured to be transparent while the power supply is turned off. Components other than those specified above are the same as the counterparts of the liquid crystal panel 16 shown in FIG. 1.

Figure 5:
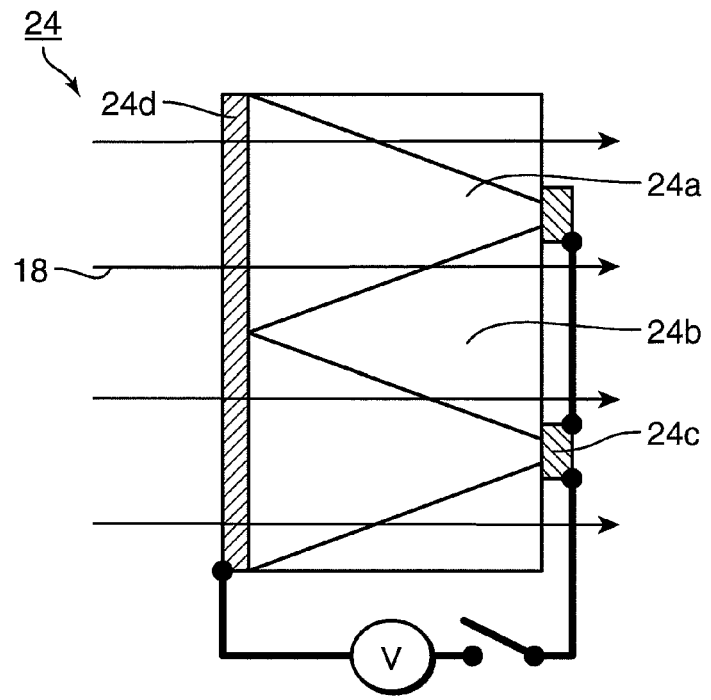
FIG. 5 is a cross section of an electro-optical prism when no voltage is applied to the electro-optical prism.
Figure 6:
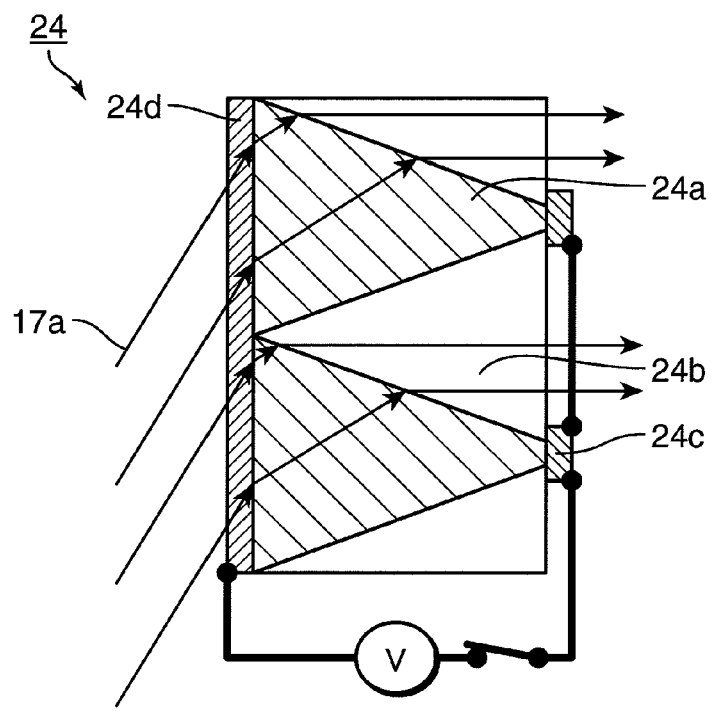
FIG. 6 is a cross section of the electro-optical prism when a voltage is applied to the electro-optical prism.

FIG. 5 and FIG. 6 are schematic cross sections showing a part of the electro-optical prism 24 electrically switchable to transmit light and to refract light. FIG. 5 is a cross section of the electro-optical prism 24 when no voltage is applied to the electro-optical prism 24. FIG. 6 is a cross section showing the electro-optical prism 24 when a voltage is applied to the electro-optical prism 24.

As are shown in FIG. 5 and FIG. 6, the electro-optical prism 24 is formed of wedge-shaped transparent electro-optical crystals 24a and transparent base materials 24b formed in a triangular shape. The former and the latter are disposed alternately so as to form a plate shape as a whole, and transparent electrodes 24c and 24d are formed at the both ends of the electro-optical crystals 24a. The electro-optical crystals 24a are, for example, KTN crystals made of potassium (K), tantalum (Ta), niobium (Nb), and oxygen (O). It has an electro-optical effect that the refractive index changes with an application of a voltage.

The cross section of the electro-optical crystals 24a is of a trapezoidal shape and the transparent electrode 24c is formed on the right side in the drawing, which is the shorter side, and the transparent electrode 24d is formed on the left side in the drawing, which is the longer side. The area of the transparent electrode 24c is different from the area of the transparent electrode 24d. For example, the area of the transparent electrode 24c is set to ¼ or less of the area of the transparent electrode 24d.

When configured in such a manner that the refractive index of the electro-optical liquid crystals 24a that are transparent while no voltage is applied and the refractive index of the transparent base materials 24b coincide with each other, as is shown in FIG. 5, the electro-optical prism 24 configured as above is in a state where the boundary layer between the electro-optical crystals 24a and the transparent base materials 24b is optically absent. It thus becomes possible to make the electro-optical prism 24 function as a transparent sheet by allowing the incoming light 18 to pass through intact.

Meanwhile, when a voltage is applied to the electro-optical prism 24, as is shown in FIG. 6, the refractive index of the wedge-shaped electro-optical crystals 24a changes and a refractive index changed region in a tapered shape is formed in a thickness direction. It thus becomes possible to make the electro-optical prism 24 function as a prism sheet that refracts and deflects light 17a entering therein with directivity in a direction tilted with respect to the principal surface 13b at the boundary between the electro-optical crystals 24a and the transparent base materials 24b.

Owing to the configuration described above, the electro-optical prism 24 is able to function as a prism sheet disposed between the light control mirror 19 and the liquid crystal panel 26 and switchable to transmit incoming light and to deflect incoming light with an application of a predetermined voltage from the control portion 9.

Figure 7:
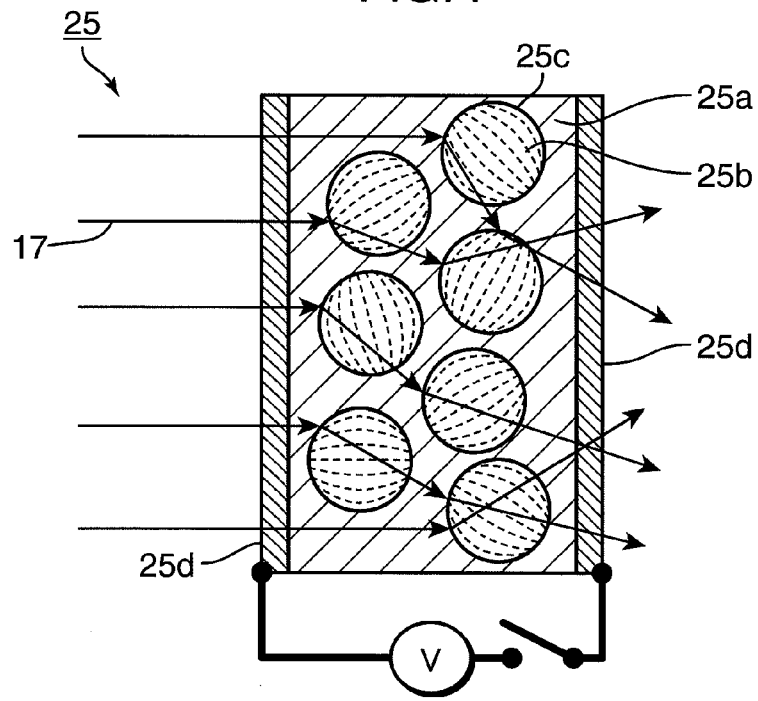
FIG. 7 is a cross section of light control liquid crystals when no voltage is applied to the light control liquid crystals.
Figure 8:
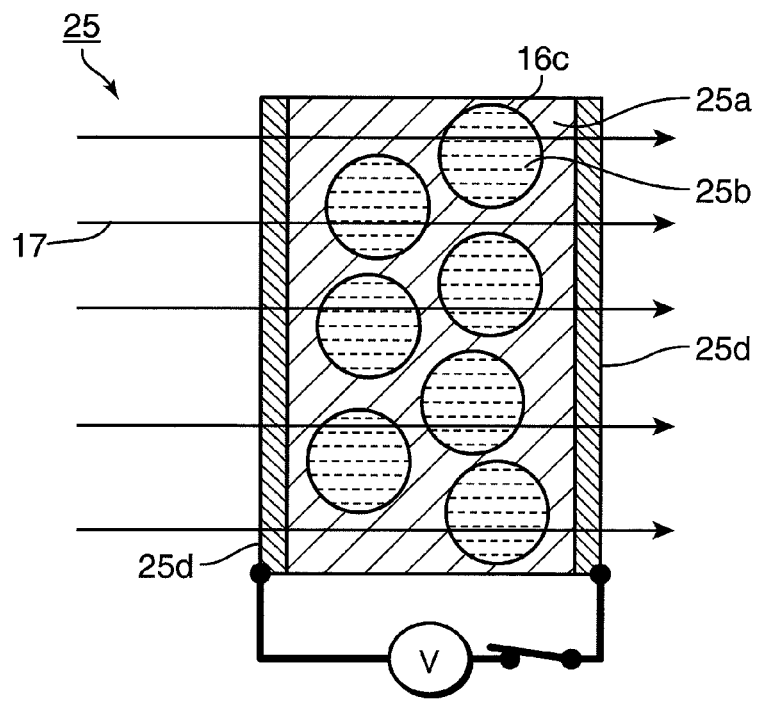
FIG. 8 is a cross section of the light control liquid crystals when a voltage is applied to the light control liquid crystals.

FIG. 7 and FIG. 8 are schematic cross sections showing a part of the light control liquid crystals 25 electrically switchable to transmit light and to diffuse light. FIG. 7 is a cross section of the light control liquid crystals 25 when no voltage is applied to the light control liquid crystals 25. FIG. 8 is a cross section of the light control liquid crystals 25 when a voltage is applied to the light control liquid crystals 25.

As are shown in FIG. 7 and FIG. 8, the light control liquid crystals 25 are formed of a transparent polymer film 25a having a structure provided with many holes like a sponge and sandwiched between a pair of transparent electrodes 25d. Liquid crystal capsules 25c are disposed in the respective holes of the polymer film 25a. Rod-like molecules 25b of nematic liquid crystals are encapsulated in the liquid crystal capsules 25c.

With the light control liquid crystals 25 formed in this manner, as is shown in FIG. 7, the rod-like molecules 25b of nematic liquid crystals are aligned along the curved surfaces of the walls of the liquid crystal capsules 25c when no voltage is applied. In this instance, because the rod-like molecules 25b of nematic liquid crystals are not aligned along the travel direction of the incoming light 17, the incoming light 17 is refracted and the optical path is bent because of a difference in refractive index between the polymer film 25a and the rod-like molecules 25b of nematic liquid crystals and birefringence of the rod-like molecules 25b of nematic liquid crystals. The light control liquid crystals 25 are thus able to diffuse the incoming light 17.

Meanwhile, when a voltage is applied to the light control liquid crystals 25, as is shown in FIG. 8, the rod-like molecules 25b of nematic liquid crystals are aligned along a direction of the electric field. Herein, when it is configured in such a manner that the refractive index of the polymer film 25a and the ordinary ray refractive index of the rod-like molecules 25b of nematic liquid crystals coincide with each other, the light control liquid crystals 25 are in a state where the boundary layer between the liquid crystal capsules 25c and the polymer film 25a is optically absent and are therefore able to transmit the incoming light 17 intact.

Owing to the configuration described above, the light control liquid crystals 25 are thus able to function as a light control sheet disposed between the light control mirror 19 and the liquid crystal panel 26 and switchable to transmit incoming light and to diffuse incoming light with an application of a predetermined voltage from the control portion 9.

As has been described, the liquid crystal panel 26 is configured so that it becomes transparent as a whole and the electro-optical prism 24, the light control liquid crystals 25, and the light control mirror 19 are switchable to a transparent state depending on whether a voltage is applied or not. It is therefore possible to provide the information display device 20 as a display device switchable to a transparent window. In addition, by turning the electro-optical prism 24 and the light control liquid crystals 25 to transparent and switching the light control mirror 19 to a mirror state, the information display device 20 functions as a mirror. On the contrary, by turning the electro-optical prism 24 and the light control mirror 19 to transparent and switching the light control liquid crystals 25 to a diffusion state, the information display device 20 becomes able to function as smoke glass.

In a case where the information display device 20 as above displays information by making use of the outside light 18, it shows a monochromatic (for example, black) display. However, because the information display device 20 is instantaneously switchable to an information display, transparent, mirror, or smoke state depending on the circumstances, it exerts many effective functions when used as window glass for a house or an automobile.

More specifically, besides a conventional function of allowing the user to watch the outside scenery through transparent glass, the information display device 20 can be used as a display that displays information thereon. Also, when it is switched to a mirror state, not only it can provide an effect of preventing a temperature rise in the room by reflecting the outside light, but also it can be used as a full-length mirror. Further, when it is switched to a smoke state, it functions as a window capable of protecting individual's privacy while admitting outside light. Furthermore, in a case where it is switched to the mirror state and the smoke state, it can be used as a light controllable window that regulates an amount of outside light entering into the room.

Also, in this embodiment, it may be configured in such a manner that three types of LED light sources that independently emit, for example, red light, green light, and blue light are used as the LED light sources 11 and the control portion 9 controls both the LED light sources of three colors and the liquid crystal panel 26, so that the red, green, and blue LED light sources are turned on sequentially and the liquid crystal panel 26 is driven synchronously. In this case, it becomes possible to display a color image by the field sequential method. When configured in this manner, it becomes possible to show a color display using the internal light source even on a display that can be turned to transparent by omitting a color filter.

Figure 9:
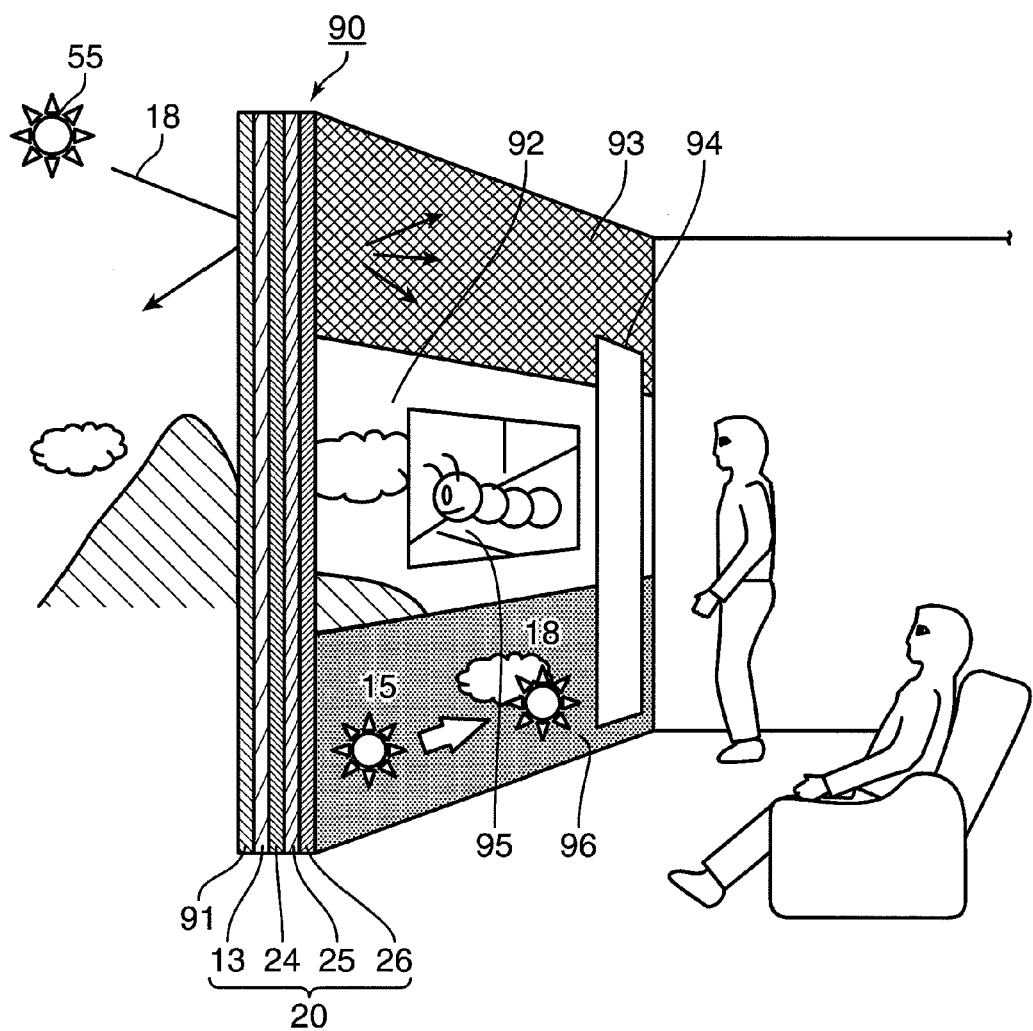
FIG. 9 is a schematic view showing an example of use of the information display device according to the second embodiment of the invention.

FIG. 9 shows an example of use of the information display device 20. Referring to FIG. 9, window glass 91 is disposed on the entire surface of a wall 90 and the information display device 20 formed of the light guide plate 13 including the light control mirror, the electro-optical prism 24, the light control liquid crystals 25, and the liquid crystal panel 26 is disposed on the window glass 91 on the inside of the room. It should be noted that the LED light sources as the internal light source and the control portion are not shown in the drawing.

The example of use of the information display device 20 shown in FIG. 9 shows a state where a display mode is changed in every region of the screen. Herein, a region 92 is set to be a transparent window. A region 94 is set to be a mirror. A region 93 is set to control light by reflecting part of the outside light 18 and to diffuse light and thereby illuminate by admitting part of the outside light 18 into the room. A region 95 is set to display a color image using the internal light source under the field sequential control. A region 96 is set to display a monochrome image by making use of the outside light 18. For example, a weather forecast is displayed in the region 96 by displaying an image 15 representing fair weather and an image 18 representing cloudy after fair.

When the information display device 20 of this embodiment is used in this manner, the window glass can be furnished with many functions. Also, in a case where it is configured in such a manner that a region to which a voltage is applied from the control portion 9 can be selected arbitrarily, because the sizes and the positions of the respective regions 92 through 96 can be changed freely, the information display device 20 can be used in various manners to suit the circumstances.

According to the configuration shown in FIG. 9, as in the region 96, a display making use of the outside light 18 alone is a monochrome display. It should be appreciated, however, that a tunable filter capable of tuning a transmission wavelength by changing a voltage as will be described below may be disposed on the opposing surface 13c of the light guide plate 13, so that the control portion 9 controls the wavelength to transmit of the tunable filter in association with the driving of the liquid crystal panel 26. In this case, the field sequential control by making use of outside light is enabled, which makes it possible to show a color display by making use of outside light.

As the tunable filter, for example, there is a filter capable of tuning the transmission wavelength by replacing uniaxial crystals with liquid crystal cells by applying the principle of a Lyot filter, which is a band-pass filter having uniaxial crystals and polarization plates layered alternately in multiple stages.

Figure 10:
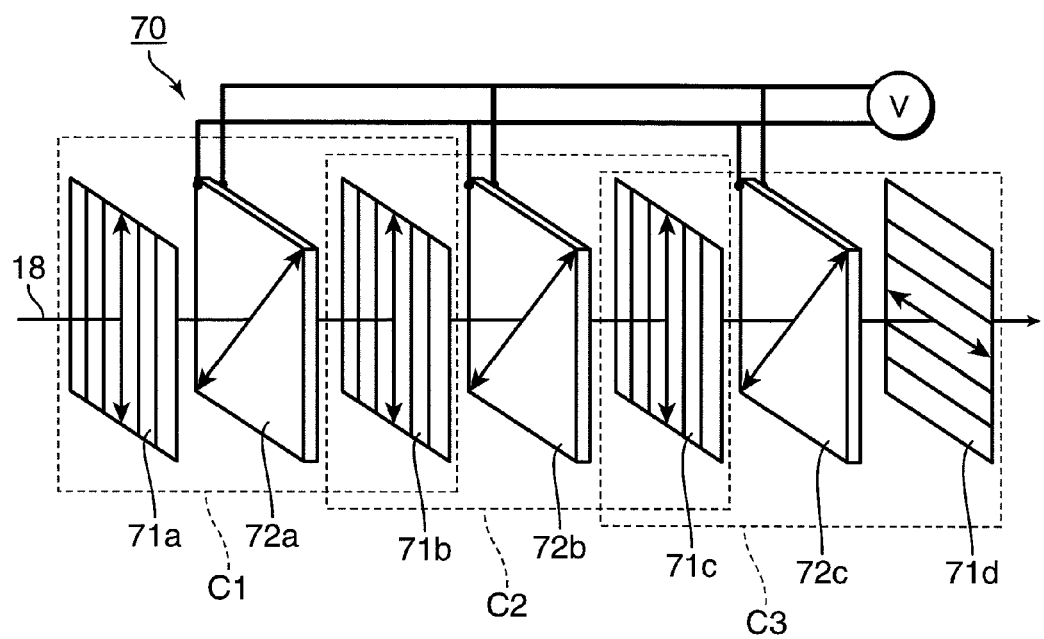
FIG. 10 is a view schematically showing the configuration of a tunable filter applicable to the information display device according to the second embodiment of the invention.

FIG. 10 is a view schematically showing the configuration of a tunable filter with the application of a Lyot filter disclosed in JP-A-2000-267127. As is shown in FIG. 10, a tunable filter 70 has a structure in which electrically controlled birefringence cells (hereinafter referred to as ECB cells) 72a, 72b, and 72c using nematic liquid crystals, and polarization plates 71a, 71b, 71c, and 71d are disposed alternately.

Herein, the polarization plates 71a, 71b, and 71c are configured in such a manner that the transmission axes are in the same direction while the polarization plate 71d is configured in such a manner that the transmission axis is orthogonal to those of the other polarization plates. The ECB cells 72a, 72b, and 72c are configured in such a manner that the optical axes have an angle of 45 degrees with respect to the transmission axes of the polarization plates 71a, 71b, 71c, and 71d. When configured in this manner, the ECB cell 72a and the polarization plates 71a and 71b form a parallel Nicols liquid crystal cell C1, the ECB cell 72b and the polarization plates 71b and 71c form a parallel Nicols liquid crystal cell C2, and the ECB cell 72c and the polarization plates 71c and 71d form a crossed Nicols liquid crystal cell C3.

It should be noted that the ECB cells 72a, 72b, and 72c are configured so as to satisfy the birefringence condition of a Lyot filter when the same voltage is applied by limiting the thicknesses of the respective ECB cells to a predetermined ratio.

When a voltage is applied to the parallel Nicols liquid crystal cells C1 and C2 and the crossed Nicols liquid crystal cell C3 in the tunable filter 70 configured as above, the birefringence of each ECB cell complies with the birefringence condition of a Lyot filter and thereby becomes a band-pass filter that transmits light of a predetermined wavelength. In addition, a wavelength to transmit can be tuned by changing the applied voltage. Hence, it becomes possible to allow any one of red light, green light, and blue light selectively from the incoming outside light.

Alternatively, as the tunable filter, a tunable filter using the configuration of a liquid crystal etalon type may be used. To this tunable filter, an etalon, which is a narrowband wavelength filter having two partially transmissive mirrors disposed at a predetermined interval in order to form a reflective resonator, is applied. A space between the two partially reflective mirrors is filled with nematic liquid crystals and the wavelength to transmit is varied by shifting the wavelength at which multiple interferences occur by changing a practical refractive index of liquid crystals with an application of a voltage.

The tunable filter of the liquid crystal etalon type can be used not only as a filter that transmits a particular wavelength but also as a mirror that reflects illumination light from the internal light source and outside light in the visible light region. Hence, because the tunable filter is capable of reflecting illumination light from the internal light source, it can be used instead of the light control mirror 19.

In this instance, by performing the control in such a manner that the tunable filter is driven so that it changes to sequentially transmit red light, reflect visible light, transmit green light, reflect visible light, transmit blue light, and reflect visible light for the red, green, and blue LED light sources to emit light sequentially when visible light is reflected, it becomes possible to perform the field sequential control using both the outside light and the internal light source.

Figure 11:
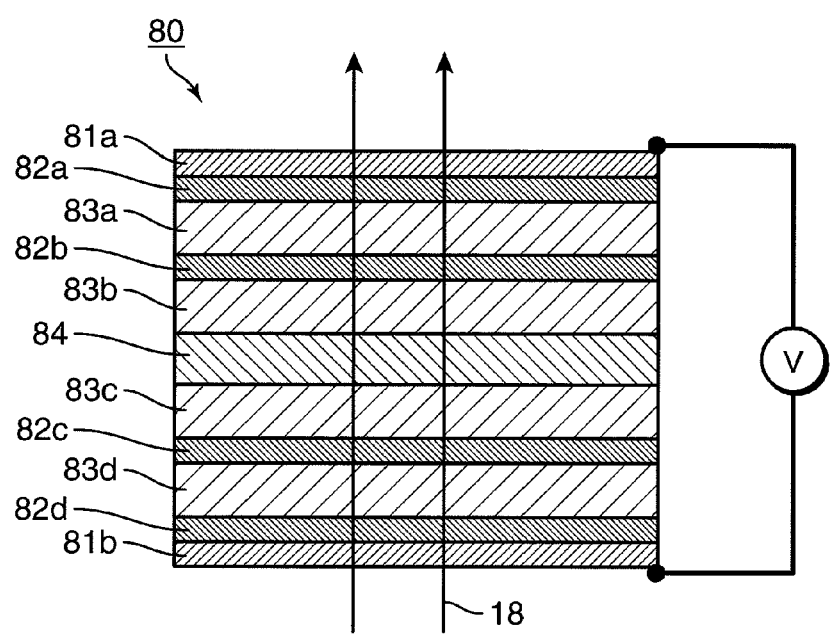
FIG. 11 is a cross section schematically showing the configuration of another tunable filter applicable to the information display device according to the second embodiment of the invention.

Also, when the partially reflective mirrors are formed of dielectric multi-layer films, it becomes possible to form a tunable filter using electro-optical crystals whose refractive index changes with an application of a voltage between the dielectric multi-layer films. FIG. 11 is a cross section schematically showing the configuration of a tunable filter of the interference filter type formed of electro-optical crystals and dielectric multi-layer films.

As is shown in FIG. 11, a tunable filter 80 is formed by layering high refractive index layers 82a, 82b, 82c, and 82d made of a high refractive index material (for example, titanium dioxide ($TiO_2$)), low refractive index layers 83a, 83b, 83c, and 83d made of a low refractive index material (for example, silicon dioxide ($SiO_2$)), and electro-optical crystals (for example, KTN crystals) 84 whose refractive index changes with an application of a voltage, and transparent electrodes 81a and 81b are formed on the light-incident side and the light-exiting side.

Herein, the high refractive index layers 82a, 82b, 82c, and 82d and the low refractive index layers 83a, 83b, 83c, and 83d are configured in such a manner that an optical film thickness found by multiplying the physical film thickness by a refractive index is substantially equal to ¼ of the set wavelength (for example, 535 nm). The electro-optical crystals 84 are configured in such a manner that the optical film thicknesses are almost equal. This structure forms a photonic bandgap in which the presence of light in the visible light wavelength range (for example, 400 nm through 700 nm) is not permitted.

When a voltage is applied between the transparent electrodes 81a and 81b of the tunable filter 80 configured as above, the refractive index of the electro-optical crystals 84 changes and they form a defective layer that breaks a part of the periodical structure. The tunable filter 80 can thus be a narrowband wavelength filter with the application of the photonic crystal technique for allowing light in a particular wavelength alone to pass through the reflection band. In this instance, the wavelength passing through the tunable filter 80 corresponds to the optical film thickness of the electro-optical crystals 84 serving as the defective layer. It thus becomes possible to change the wavelength to transmit with a voltage to be applied. Hence, even when configured in this manner, effects same as those of the tunable filter of the liquid crystal etalon type can be provided. It thus becomes possible to achieve the configuration that makes use of both the internal light source and the outside light simultaneously.

Also, when the tunable filter as above is configured in such a manner that the wavelength to transmit is changed in each predetermined region, the information display device becomes able to display a partially colored image while transmitting the background like stained glass. For example, in a case where a relative position between the position of the eyes and the information display device is roughly fixed like a driver of an automobile, it is possible to configure in such a manner that a portion in the background for which the driver should be on the alert, for example, a passenger, is displayed in color.

Figure 12:
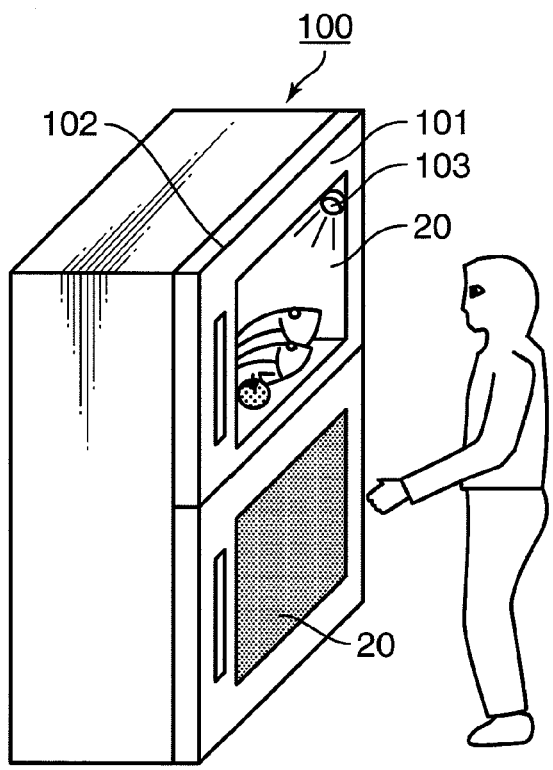
FIG. 12 is a schematic view showing another example of use of the information display device according to the second embodiment of the invention.

Also, the information display device 20 of this embodiment can be turned to transparent so as to confirm a state outside the window besides the use as a window to admit outside light. FIG. 12 shows an example where the information display device 20 formed using the electro-optical prism 24 and the light control liquid crystals 25 and configured so that it can be turned to transparent is used as the door of a refrigerator.

Referring to FIG. 12, a door 101 of a refrigerator 100 is provided with a window 102 formed so that the interior can be confirmed and the information display device 20 is fit in this window 102. The information display device 20 is configured in such a manner that it is normally used as a mirror or an information display device and it is also configured in such a manner that it can be turned to transparent when the necessity arises and that the interior can be confirmed by illuminating the inside of the refrigerator by an illuminating device 103, such as a lamp, while the information device 20 is turned to transparent.

When configured in this manner, the user wishing to confirm what is inside the refrigerator 100 is able to confirm the inside of the refrigerator without having to open the door 101 because the information display device 20 can be instantaneously switched to a transparent state. Consequently, the door 101 is opened less frequently and because the user can confirm where a particular thing he wants is placed before he takes it out from inside the refrigerator, a time over which the door 101 is kept open can be shortened. It thus becomes possible to reduce power consumption of the refrigerator 100.

The electro-optical prism 24 shown in FIG. 5 and FIG. 6 is configured to become transparent when the power supply is turned off and the light control liquid crystals 25 shown in FIG. 7 and FIG. 8 are configured to become transparent when the power supply is turned on. It should be appreciated, however, that states where each becomes transparent are not limited to the examples above and various modifications are possible. For example, in a case where the information display device 20 is used in a transparent state over a long time, it is preferable to configure in such a manner that the electro-optical prism 24 and the light control liquid crystals 25 become transparent when the power supply is turned off, because power consumption can be reduced. Herein, it is also preferable to configure in such a manner that the liquid crystal panel 26 is normally white and turned to transparent when the power supply is turned off.

Because the embodiment using the tunable filter shown in FIG. 10 and FIG. 11 can be configured to become a mirror when the power supply is turned off, it can be suitably applied to a case where the information display device 20 is normally used as a mirror. Also, when the mirror and an image display are combined, the information display device 20 can be applied to a device configured, for example, to superimpose an image display of clothes on a full-length mirror, so that the user can pick up desired clothes from a variety of choices.

In the embodiment described above, LED light sources are used as the light source. It should be appreciated, however, that the invention is not limited to this configuration, and the light source can be cold-cathode tubes or laser light sources. When cold-cathode tubes are used as the light source, an information display device at a further lower cost can be achieved. When laser light sources are used as the light source, an information display device with high color reproducibility in a state where the internal light source is used can be achieved. Further, it may be configured in such a manner that laser light sources emitting laser beams are used as the internal light source and a wavelength-selective mirror formed of a reflection film that selectively reflects light in the vicinity of the wavelength of a laser beam alone is used as the light control mirror 19, so that light in the vicinity of a laser beam alone is selectively reflected without an application of a voltage. In this case, an information display device capable of showing a see-through display can be achieved, and such an information display device is useful as a head up display showing various displays on the windshield of an automobile or the like.

Third Embodiment

Figure 13:
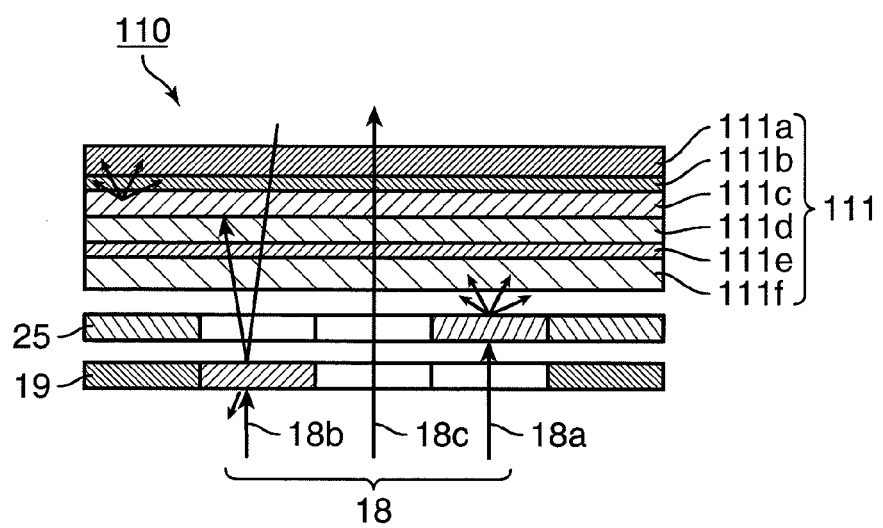
FIG. 13 is a cross section schematically showing the configuration of an information display device according to a third embodiment of the invention.

FIG. 13 is a cross section schematically showing the configuration of an information display device according to a third embodiment of the invention. In contrast to the embodiments above configured to use a liquid crystal panel as a display panel, an information display device 110 of this embodiment is formed by combining a transparent inorganic EL panel 111, a light control mirror 19, and light control liquid crystals 25. The transparent inorganic EL panel 111 is formed of a light emitting layer 111c and an insulating layer 111d sandwiched between a pair of transparent electrodes 111b and 111e, which are further sandwiched between a cover layer 111a and a glass substrate 111f from the both sides.

When configured in this manner, for example, in a case where outside light 18a is used by turning the light control mirror 19 to transparent, it becomes possible to show a white (smoke) display in a transparent background by partially controlling the light control liquid crystals 25. Accordingly, because information can be displayed using the outside light 18 alone, power consumption can be reduced.

Also, when the light control mirror 19 and the transparent inorganic EL panel 111 are used, by turning a part of the light control mirror 19 opposing the back surface of the transparent inorganic EL panel 111 in a portion where information is being displayed, outside light 18b from the back surface is reflected and shielded on one hand, and on the other hand light from the transparent inorganic EL panel 111 is reflected and returned to the transparent inorganic EL panel 111 in a portion displayed by the transparent inorganic EL panel 111. It thus becomes possible to achieve a high luminance and high contrast EL display.

Also, when the light control mirror 19, the light control liquid crystals 25, and the transparent inorganic EL panel 111 are turned to transparent, the outside light 18c is allowed to pass through. The information display device 110 can be therefore used as a transparent window.

When a display is shown using the light control mirror 19, the light control liquid crystals 25, and the transparent inorganic EL panel 111, a display can be shown by combining a luminescent display by the transparent inorganic EL panel 111 and a transparent, smoke, or mirror portion. A wide variety of information displays can be thus achieved.

When the tunable filter shown in FIG. 11 or the like is used instead of the light control mirror 19, because a transmission wavelength of the background can be selected, the background can be colored. It thus becomes possible to display information on a background like stained glass.

Fourth Embodiment

Figure 14:
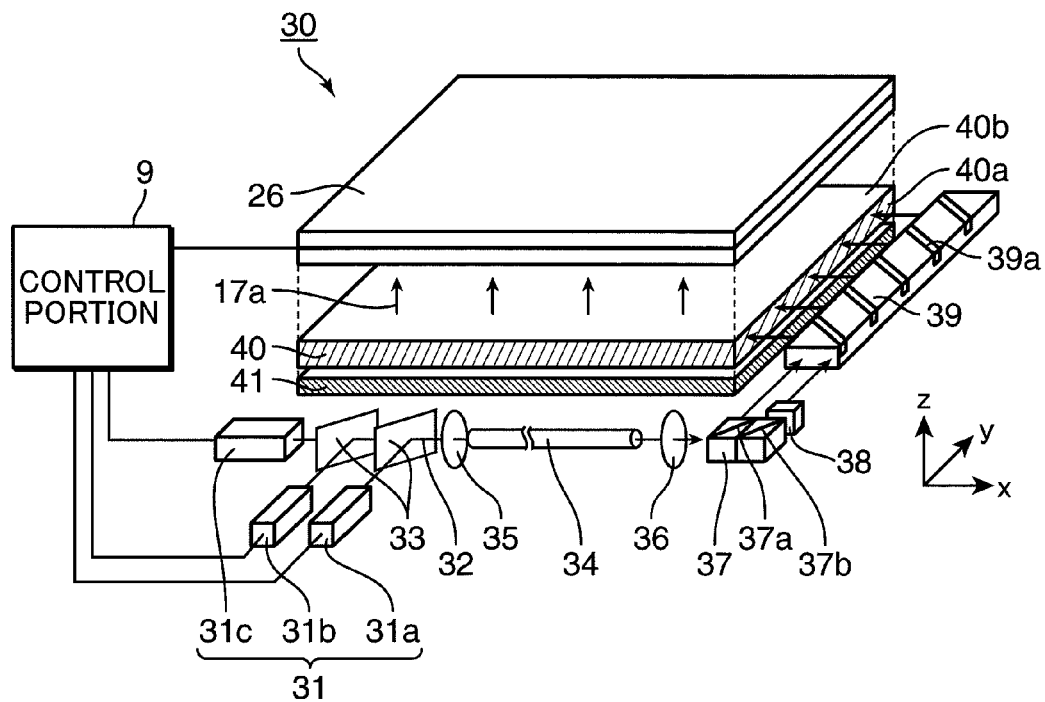
FIG. 14 is a perspective view schematically showing the overall configuration of an information display device according to a fourth embodiment of the invention.
Figure 15:
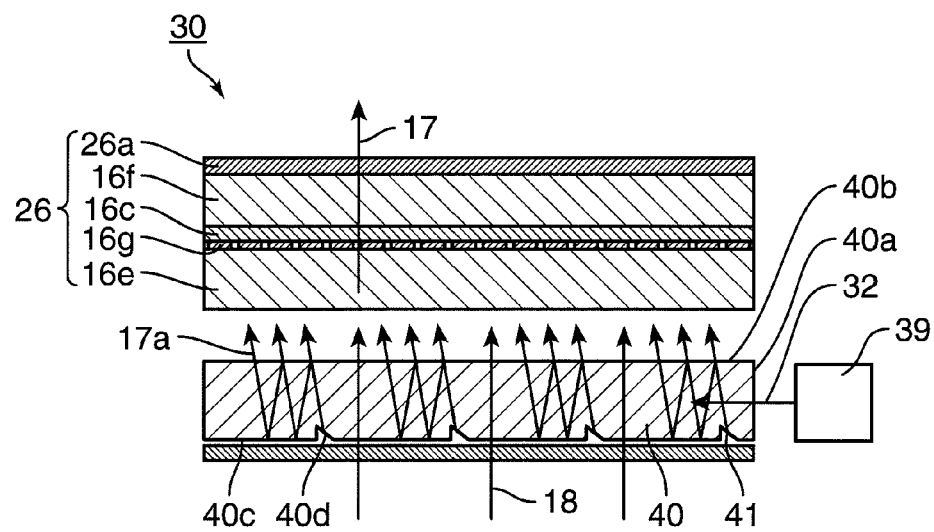
FIG. 15 is a cross section in an x-z plane of a major portion of the information display device shown in FIG. 14.

FIG. 14 and FIG. 15 are views schematically showing the configuration of an information display device according to a fourth embodiment of the invention. FIG. 14 is a perspective view schematically showing the overall configuration of the information display device according to the fourth embodiment of the invention. FIG. 15 is a cross section in an x-z plane of a major portion of the information display device shown in FIG. 14. Like components are labeled with like reference numerals with respect to the embodiments above and descriptions of such components are omitted herein.

As are shown in FIG. 14 and FIG. 15, an information display device 30 of this embodiment includes a laser light source 31, a dichroic mirror 33, an optical fiber 34, a collecting lens 35, a collimator lens 36, a compound prism 37, a ½ wavelength plate 38, a light guide rod 39, a light guide plate 40, a liquid crystal panel 26, and a control portion 9.

The laser light source 31 is formed of three light sources: a red laser light source (hereinafter, referred to as the R light source) 31a emitting a red laser beam (hereinafter, referred to as R light), a green laser light source (hereinafter, referred to as the G light source) 31b emitting a green laser beam (hereinafter, referred to as G light), and a blue laser light source (hereinafter, referred to as the B light source) 31c emitting a blue laser beam (hereinafter, referred to as B light).

The dichroic mirror 33 combines the R light, the G light, and the B light emitted from the laser light source 31 and ejects the combined beams as a laser beam 32. The collecting lens 35 collects the laser beam 32 to be injected into the optical fiber 34. The optical fiber 34 transmits the laser beam 32 to the collimator lens 36. The collimator lens 36 collimates the laser beam 32 exiting from the optical fiber 34.

The compound prism 37 divides the laser beam 32 to two light fluxes through polarization separation. The ½ wavelength plate 38 rotates the polarization of one of the two light fluxes divided by the compound prism 37 through polarization separation by 90 degrees. The light guide rod 39 converts the laser beam 32 to linear parallel light and ejects the converted laser beam 32. The laser light 32 exiting from the light guide rod 39 enters into the light guide plate 40 from the side surface 40a and exits from the one principal surface 40b. The polarization reflection sheet 41 is disposed adjacently to the opposing surface 40c of the light guide plate 40 opposing the principal surface 40b. It reflects a particular polarization component and transmits a polarization component in a direction orthogonal to the particular polarization component.

Herein, it is configured in such a manner that each of the light sources 31a, 31b, and 31c includes a collimator lens so that each emits parallel light. For example, high-output semi-conductor lasers that emit R light having a wavelength of 640 nm and B light having a wavelength of 445 nm are used as the R light source 31a and the B light source 31c, respectively. A high-output SHG laser pumped by a semiconductor laser that emits G light having a wavelength of 535 nm is used as the G light source 31b.

The compound prism 37 includes a polarization beam splitter surface 37a and a reflection surface 37b both titled by about 45 degrees with respect to the surface on which light goes incident. The polarization beam splitter surface 37a transmits P polarized light and reflects S polarized light, whereas the reflection surface 37b reflects P polarized light having passed through the polarization beam splitter surface 37a. The compound prism 37 is configured to divide incoming light through polarization separation and to eject the separated light after it is deflected by 90°.

The light guide rod 39 is provided with a plurality of deflection grooves 39a having titled surfaces tilted by substantially 45° with respect to the side surface from which light exits. The light guide rod 39 is configured to deflect incoming light by substantially 90° by total reflection.

Also, the opposing surface 40c of the light guide plate 40 is provided with a plurality of deflection grooves 40d having tilted surfaces tilted by substantially 45° with respect to the principal surface 40b and it is therefore configured so as to deflect light entering into the light guide plate 40 toward the principal surface 40b by total reflection. Further, a reflection film configured to reflect only light in a narrowband including wavelengths of the R light, the G light, and the B light is formed on the principal surface 40b. The reflection film is configured in such a manner that the laser beam 32 deflected by the deflection grooves 40d is reflected repetitively between the principal surface 40b and the opposing surface 40c by changing the transmittance and the reflectance in response to the cycle of the deflection grooves 40d, and eventually exits homogeneously.

The liquid crystal panel 26 is of substantially the same structure as the counterpart of the second embodiment above configured to become transparent by omitting a color filter except that the polarization plate 26b on the light-incident side is further omitted. Also, the information display device 30 includes the control portion 9 that controls the laser light source 31 and the liquid crystal panel 26. It is therefore configured in such a manner that a color display is shown under the field sequential control even in the absence of a color filter.

In the information display device 30 configured in this manner, R light, G light, and B light respectively emitted from the R light source 31a, the G light source 31b, and the B light source 31c are collimated for each light source and combined into the laser beam 32 by the dichroic mirror 33. The laser beam 32 is then collected by the collecting lens 35 and injected into the optical fiber 34. After the laser beam 32 is transmitted via the optical fiber 34, it is collimated by the collimator lens 36 and injected into the compound prism 37.

Of the laser beam 32 injected into the compound prism 37, an S polarized component is reflected on the polarization beam splitter surface 37a and a P polarized component having passed through the polarization beam splitter surface 37a is reflected on the reflection surface 37b and both exit from the compound prism 37. Polarization of light of the P polarized component exiting from the compound prism 37 is rotated by 90° by the ½ wavelength plate 38 and this light enters into the light guide rod 39 together with the S polarized component exiting from the compound prism 37 in a state where polarization directions are aligned. The light exits perpendicularly with respect to the side surface 40a of the light guide plate 40 because of a plurality of the deflection grooves 39a while maintaining the polarization and enters into the light guide plate 40.

The laser beam 32 entering into the light guide plate 40 is reflected on the deflection grooves 40d formed on the opposing surface 40c and passes through the principal surface 40b in part while the rest is reflected thereon. In this instance, when configured in such a manner that the polarization reflection sheet 41 reflects the same polarization component as the laser beam 32 and transmits a polarization component in a direction orthogonal to the direction of the reflected polarization component, the laser beam 32 is repetitively reflected between the principal surface 40b and the polarization reflection sheet 41 and eventually exits homogeneously from the principal surface 40b. The laser beam 32 thus enters into the liquid crystal panel 26 while maintaining the polarization. Meanwhile, a polarization component of the outside light 18 orthogonal to the laser beam 32 passes through the polarization reflection sheet 41 and enters into the liquid crystal panel 26 by way of the light guide plate 40.

The laser beam 32 entering into the liquid crystal panel 26 exits after intensity modulation is applied in the liquid crystal panel 26 and a color image is displayed under the field sequential control. In this instance, polarization of the outside light 18 is orthogonal to polarization of the laser beam 32 and the outside light 18 therefore passes through the liquid crystal panel 26 while hardly being influenced by the intensity modulation in the liquid crystal display panel 26.

When configured in this manner, as with the second embodiment above, the information display device 30 can be turned to transparent while the laser light source 31 as the internal light source is turned off. Further, by guiding the laser beam 32 and the outside light 18 to the liquid crystal panel 26 simultaneously, it becomes possible to make a color image emerge on a transparent background in this embodiment. Also, because the directivity of the output light 17 exiting from the information display device 30 is high, by displaying information effectively in a particular direction alone, not only can power consumption be reduced, but also the cost can be reduced because no diffusing sheet is used.

Also, because the laser light source 31 is used in this embodiment, there are significant advantages over the method of using LED light sources or cold-cathode tubes as the light source.

Firstly, because the optical fiber 34 can be used by utilizing the light collecting property of laser beams, it is possible to dispose the laser light source 31 generating considerable heat and thereby requiring a heat release mechanism separately from the liquid crystal panel 16 in a place where heat is released readily and to transmit light from the disposed position to the light guide plate 40 without a loss in amount of light. Accordingly, because an image display portion excluding the light source portion can be formed smaller and thinner, the degree of freedom in layout of the image display portion can be enhanced. Also, because heat can be released from the light source sufficiently, the information display device 30 can operate on lower power consumption.

Also, because substantially parallel light can be injected into the light guide plate 40, by injecting the laser beam 32 into the light guide plate 40 in aligned polarization, the laser beam 32 is allowed to exit while maintaining the polarization. Accordingly, because the polarization plate on the light-incident side of the liquid crystal panel 26 can be omitted, the cost can be reduced. Further, because the electro-optical conversion efficiency is extremely high, efficiency of 30% or higher can be readily achieved. With the features as described above, the information display device 30 can be driven by about half the power consumption of the type using the LED light sources.

In this embodiment, it is configured to inject parallel light into the light guide plate 40. However, it may be configured in such a manner that the laser beam 32 is collected in the thickness direction of the light guide plate 40 before it is injected therein. Herein, the width of the incoming light in the thickness direction can be reduced to as small as 1 μm. Accordingly, the light guide plate 40 as thin as several μm to 10 μm can be used or the light guide plate 40 about 100 μm thick can be used. Herein, the light guide plate 40 is formed of a sheet of optical waveguide and it may be formed as a polarization maintaining waveguide that maintains the polarization direction of the laser beam 32 entering from the side surface 40a. When configured in this manner, it becomes possible to achieve an extremely thin and efficient information display device.

Alternatively, the optical fiber 34 may be a polarization maintaining fiber so that the laser light source 31 is configured so as to emit light in an aligned polarization direction. When configured in this manner, the compound prism 37 and the ½ wavelength plate 38 can be omitted. The cost can be thus reduced further.

Figure 16:
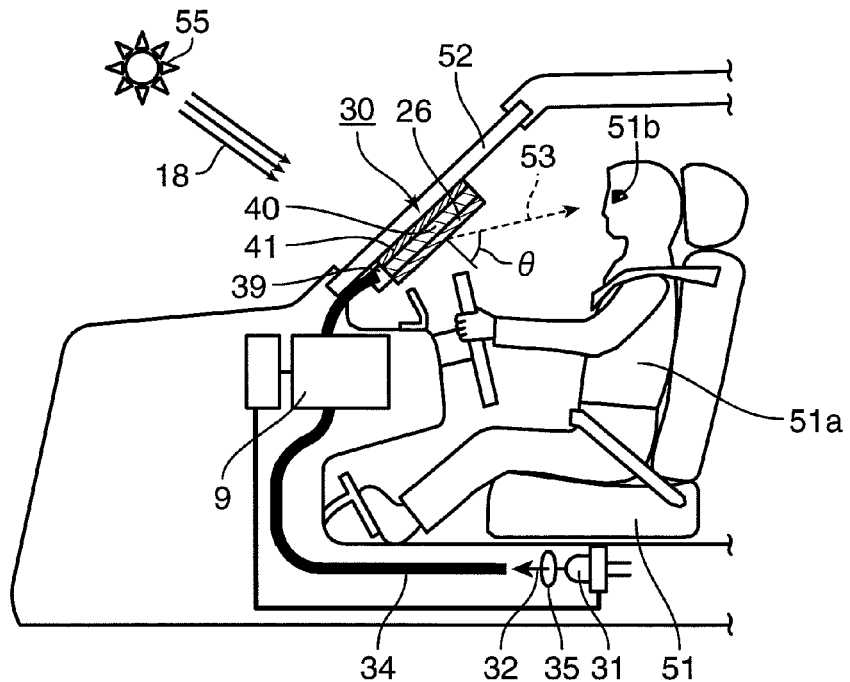
FIG. 16 is a view schematically showing the structure of a vehicle incorporating the information display device according to the fourth embodiment of the invention.

The information display device 30 as above is suitably applied, for example, to a head up display that displays various types of information on the windshield of an automobile or the like. FIG. 16 is view schematically showing the structure of a vehicle incorporating the information display device 30. This is a schematic view when the vehicle is divided vertically between the driver's seat and the front passenger's seat and the driver's seat is viewed from the side surface. Like components are labeled with like reference numerals with respect to FIG. 14 and FIG. 15 and descriptions of such components are omitted herein.

In an example of the configuration shown in FIG. 16, the information display device 30 is configured in such a manner that the laser light source 31 is disposed under a passenger's seat 51 where heat is readily released so that heat is released across the entire bottom portion of the vehicle. It is also configured in such a manner that the laser beam 32 is guided to the light guide plate 40 via the optical fiber 34. The image display portion formed of the liquid crystal panel 26, the light guide plate 40, and the polarization reflection sheet 41 is disposed adjacently to a window 52 of the vehicle in such a manner that output light 53 exiting from the image display portion is outputted at a predetermined angle θ with respect to a direction perpendicular to the output surface of the liquid crystal panel 26. It is therefore configured in such a manner that the output light 53 goes incident on the eyes 51b of a driver 51a at an angle easy for the driver 51a in the driver's seat to visually recognize. Further, the information display device 30 includes the control portion 9 and it is configured in such a manner that the liquid crystal panel 26 and the laser light source 31 are controlled by the control portion 9 on the basis of various types of information of the inside and the outside of the vehicle, so that a color display is shown under the field sequential control.

When configured in this manner, because a see-through color image can be displayed on the inner surface of the window 52 of the vehicle, the movement of the eye-point can be smaller when the driver 51a confirms the image information. Accordingly, information can be delivered safely. In addition, by displaying the information efficiently only in the direction to the eyes 51b of the driver owing to high directivity of the output light and by disposing the laser light source 31 to a position where heat is readily released and remote from the window 52 of the vehicle where the temperature rises due to irradiation of sunlight 55, power consumption of the laser light source 31 can be reduced. It thus becomes possible to achieve a compact, thin, and low power consuming head up display with good visibility.

Figure 17:
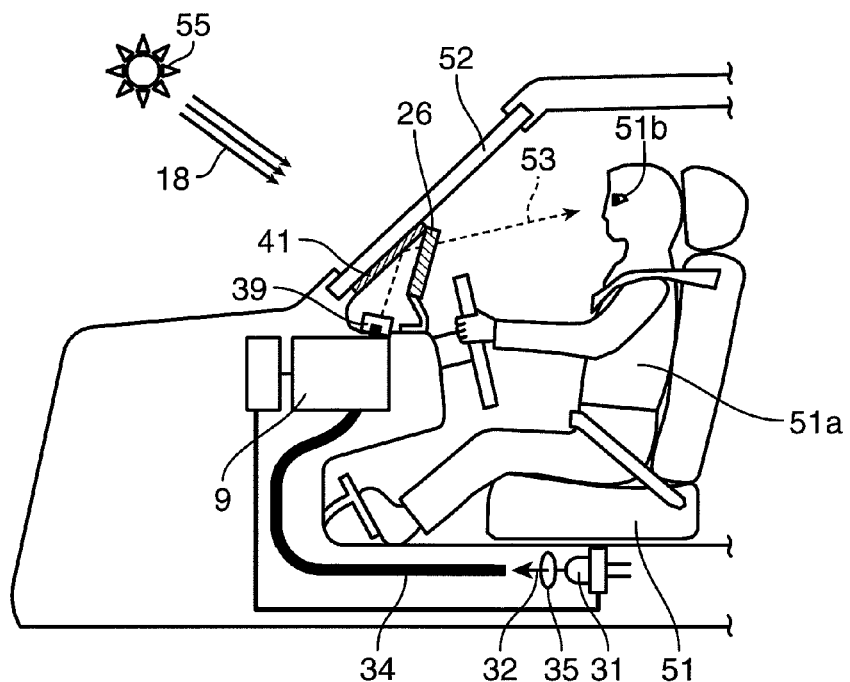
FIG. 17 is a view schematically showing the structure of a vehicle incorporating another information display device according to the fourth embodiment of the invention.

Alternatively, the information display device may be formed as a rear projection type as shown in FIG. 17. FIG. 17 is a schematic view showing an example of a modification of the vehicle structure shown in FIG. 16. This is also a schematic view when the vehicle is divided vertically between the driver's seat and the front passenger's seat and the driver's seat is viewed from the side surface.

A difference of FIG. 17 from the structure shown in FIG. 16 is that it is configured in such a manner that the light guide plate 40 is omitted and the laser beam 32 exiting from the light guide rod 39 is guided to the back surface of the liquid crystal panel 26 by reflecting the laser beam 32 on the polarization reflection sheet 41 disposed in close contact with the inner surface of the window 52 of the vehicle. In FIG. 17, like components are labeled with like reference numerals with respect to FIG. 14 through FIG. 16. Even when configured in this manner, it is possible to achieve a compact, thin, and low power consuming head up display with good visibility. Further, because the light guide plate is omitted in this configuration, the cost can be reduced further.

In the information display device 30 of this embodiment, a narrowband reflection sheet configured to reflect only light in a narrowband including the wavelengths of R light, G light, and B light may be used instead of the polarization reflection sheet 41. Even when configured in this manner, because the narrowband reflection sheet reflects the laser beam 32 and transmits most of the outside light 18, similar effects can be achieved.

Also, in the information display device 30 of this embodiment, it may be configured in such a manner that the light control liquid crystals 25 shown in FIG. 7 and FIG. 8 as a light control sheet is inserted between the polarization reflection sheet 41 and the liquid crystal panel 26 or provided on the light-exiting side of the liquid crystal panel 26 (the viewing side of the liquid crystal panel 26) so as to switch between a narrow view angle and a wide view angle. Alternatively, it may be configured in such a manner that the electro-optical prism 24 shown in FIG. 5 and FIG. 6 as a prism sheet is inserted between the polarization reflection sheet 41 and the liquid crystal panel 26 or provided on the light-exiting side of the liquid crystal panel 26 (the viewing side of the liquid crystal panel 26) so as to switch viewing directions.

When configured in this manner, it is possible to make a switch to display information for passengers other than the driver. Also, when the light control mirror 19 described in the second embodiment above is used instead of the polarization reflection sheet 41, outside light can be shielded when information is displayed. It thus becomes possible to display a high-contrast image.

Fifth Embodiment

Figure 18:
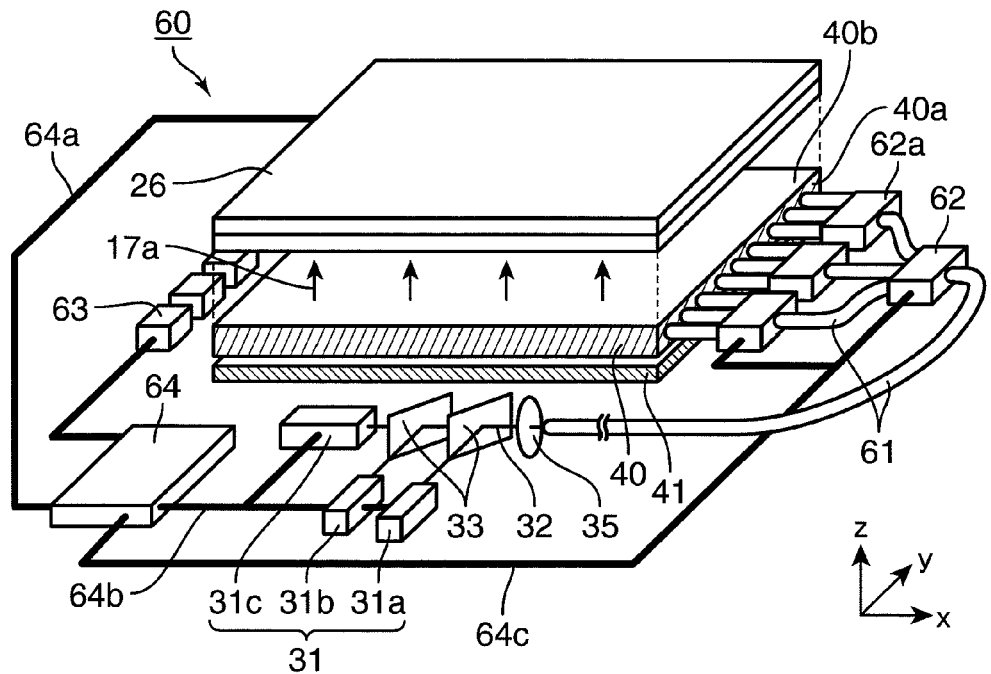
FIG. 18 is a perspective view schematically showing the overall configuration of an information display device according to a fifth embodiment of the invention.
Figure 19:
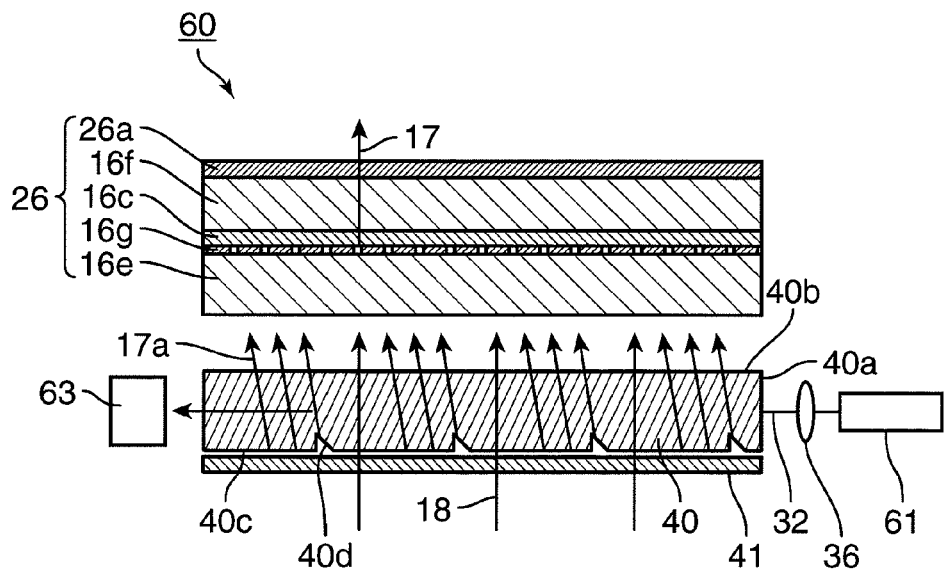
FIG. 19 is a cross section in an x-z plane of a major portion of the information display device shown in FIG. 18.

FIG. 18 and FIG. 19 are views schematically showing the configuration of an information display device according to a fifth embodiment of the invention. FIG. 18 is a perspective view schematically showing the overall configuration of the information display device according to the fifth embodiment of the invention. FIG. 19 is a cross section in an x-z plane of a major portion of the information display device shown in FIG. 18. Like components are labeled with like reference numerals with respect to the embodiments above and description of such components are omitted herein.

An information display device 60 shown in FIG. 18 and FIG. 19 includes, as with the information display device 30 described in the fourth embodiment above, a laser light source 31, a dichroic mirror 33, a collecting lens 35, a light guide plate 40, a polarization reflection sheet 41, and a liquid crystal panel 26. It includes polarization maintaining fibers 61 that transmit light while maintaining polarization instead of the optical fiber 34. It further includes a light scanning portion 62 and split light scanning portions 62a disposed between the polarization maintaining fibers 61 and the side surface 40a of the light guide plate 40, a light receiving element 63 disposed adjacently to the side surface of the light guide plate 40 opposing the side surface 40a, and a control portion 64 that controls the laser light source 31, the liquid crystal panel 26, the light scanning portion 62, and the split light scanning portions 62a.

Herein, it is configured in such a manner that respective laser beams emitted from the light source 31 are aligned in polarization when combined. It is also configured in such a manner that the respective polarization maintaining fibers 61 guide respective laser beams while maintaining the polarization. In this embodiment, all the optical fibers are polarization maintaining fibers (hereinafter, referred to simply as the fibers).

Also, the light scanning portion 62 is formed, for example, of an optical switch using a dielectric waveguide that exploits the electro-optical effect and includes electrodes, for example, in a triangular shape, on the both sides to sandwich the waveguide. It is therefore configured so as to function as a prism that deflects light by changing the refractive index of the region sandwiched between the electrodes when a voltage is applied between the electrodes. The light scanning portion 62 is configured so as to switch fibers to eject light by deflecting the incoming laser beam 32 in a desired direction. The light exiting from the light scanning portion 62 is guided to the corresponding split light scanning portion 62a of the same structure as the light scanning portion 62 by passing through any one of the fibers so that a fiber to eject the light is switched further.

Also, the control portion 64 is configured so as to control the laser light source 31, the liquid crystal panel 26, the light scanning portion 62, and the split light scanning portion 62a on the basis of an amount of light detected by the light receiving element 63. To be more concrete, the light scanning portion 62 and the split light scanning portion 62a are controlled so as to switch fibers to guide light in time series, and the laser light source 31 and the liquid crystal panel 26 are controlled so as to perform the field sequential control. The control on the respective components is performed electrically via wires 64a, 64b, and 64c connected to the control portion 64.

Although it is not shown in FIG. 18, as is shown in FIG. 19, a collimator lens 36 that collimates light exiting from the polarization maintaining fibers 61 is provided on the light-exiting ends of the polarization maintaining fibers 61 to which light split by the split light scanning portion 62a is guided.

In the information display device 60 configured in this manner, R light, G light, and B light respectively emitted from the R light source 31a, the G light source 31b, and the B light source 31c in aligned polarization are combined into the laser beam 32 and collected by the collecting lens 35. The collected laser beam 32 is then injected into the polarization maintaining fiber 61 and guided to the light scanning portion 62 while the polarization is maintained.

For the laser beam 32 guided to the light scanning portion 62, fibers to guide the laser beam 32 are switched in time series by the light scanning portion 62 and the split light scanning portions 62a. Accordingly, incident light on the light guide plate 40 is scanned along the side surface 40a. In this instance, the laser beam 32 exiting from each polarization maintaining fiber 61 is turned to substantially parallel light by the collimator lens 36 and enters into the light guide plate 40. The laser beam 32 therefore propagates substantially perpendicularly to the side surface 40a and a line-shaped region emits light on the principal surface 40b of the light guide plate 40 at given instant. Because the line-shaped region is scanned in the y direction in the drawing by the light scanning portion 62 and the split light scanning portion 62a, a so-called backlight scroll operation is performed.

In this instance, the respective light sources in the laser light source 31 are turned on sequentially by the control portion 64 to scan laser beams of respective colors sequentially field by field while adjusting the luminance of respective pixels of the liquid crystal panel 26 corresponding to the respective colors in association with the scanning. The backlight scroll and the field sequential control are thus performed simultaneously. It should be noted that because the controls described above are performed with reference to a detection signal of the light receiving element 63 in this embodiment, the controls are unsusceptible to an environmental change, such as a temperature, and a temporal change. The controls can be therefore performed at high accuracy.

As with the fourth embodiment above, the laser beam 32 exiting from the light guide plate 40 enters into the liquid crystal panel 26 in aligned polarization while the outside light 18 passing through the polarization reflection sheet 41 and the light guide plate 40 is turned to polarized light orthogonal to the laser beam 32 and enter into the liquid crystal panel 26. Consequently, a color image as an output image from the liquid crystal panel 26 is displayed in a transparent background.

In the information display device 60 of this embodiment configured as above, not only can a color image be displayed on a transparent display, but also a moving image performance can be enhanced by the backlight scroll. In addition, because an amount of light entering into the light guide plate 40 can be monitored and corrected, it is possible to display an image at a high image quality with fewer luminance irregularities and color irregularities.

The information display device 60 of this embodiment is configured in such a manner that respective laser beams are scanned sequentially per color field by field by the backlight scroll operation. However, it may be configured in such a manner that a wavelength separation element is disposed inside the light scanning portion 62 to separate the laser beam 32 to R light, G light, and B light, which are scanned independently so as not to be injected into the same region of the light guide plate 40 at the same time. For example, by setting one line of R light, one light of G light, and one line of B light so that each is disposed on a different pixel, the field sequential control may be performed by scanning a set of the three lines sequentially field by field. When configured in this manner, it is sufficient for the light source 31 to be in a state where it emits light in a CW (continuous wave), that is, to emit light continuously, and high speed modulation is not necessary. Hence, the light source 31 can be operated in a thermally stable manner. It is therefore possible to eliminate a problem, such as a droop characteristic that an output of a laser beam varies because of a thermal instability.

It should be appreciated that the first through fifth embodiments of the invention described above are mere examples and various modifications are possible without deviating from the scope of the invention. Also, all the configurations can be combined in any manner and it goes without saying that the effects unique to the invention are achieved as well.

From the embodiments above, the invention can be summarized as follows. That is, an information display device of the invention includes a light source, a liquid crystal panel formed by encapsulating liquid crystals between two base materials, and an illumination light selection member disposed in an optical path between the light source and the liquid crystal panel and configured in such a manner that back light enters therein from a back surface. The illumination light selection member illuminates a back surface of the liquid crystal panel with at least one of light that is light from the light source reflected on the illumination light selection member and light that is the back light having passed through the illumination light selection member.

This information display device is able to display information by making use of one or both of the internal light source of the device and the back light. Also, the information display device can admit back light sufficiently from the entire back surface as outside light. Hence, not only can it display information in a satisfactory manner, but also it can be used as a light controllable window by admitting outside light at predetermined brightness while information is not displayed. In addition, because an ultra-thin information display device can be achieved, it can be fit into a window for a building or a vehicle as with a normal window without looking strange. For example, when this information display device is disposed to a window portion that can admit sunlight, information can be displayed by using backlight, which is the outside light, without using the internal light source when the outside light during daytime is bright. It thus becomes possible to reduce power consumption and a low power consumption information display device can be achieved.

It is preferable that the liquid crystal panel is formed of a member transparent to the light from the light source and the back light.

In this case, the liquid crystal panel does not include a color filter and becomes transparent to light from the light source and back light. Accordingly, by combining such a liquid crystal panel with the transparent illumination light selection member, it becomes possible to achieve a transparent information display device switchable to function as a transparent window to admit outside light and as a display to display information thereon.

It is preferable that the light source includes at least three light sources that independently emit red light, green light, and blue light, and that the information display device further includes a control portion that controls the three light sources and the liquid crystal panel so that a color image is displayed by a field sequential method.

In this case, an information display device that can be turned to transparent by omitting a color filter becomes able to display a color image using the internal light source.

It is preferable that: the illumination light selection member includes a light guide plate to which the light from the light source enters from a side surface and from which the light exits from one principal surface; the information display device further includes a light scanning portion that scans the light from the light source along the side surface; and the control portion performs the field sequential control by controlling the light sources to emit light continuously and the light scanning portion to scan the red light, the green light, and the blue light emitted from the light sources on different regions of the light guide plate, and by driving the liquid crystal panel according to the regions scanned by the red light, the green light, and the blue light.

In this case, because the field sequential control can be performed without modulating the light source at a high speed, the light source can be operated in a thermally stable manner. Accordingly, in a case where a laser light source is used as the light source, it becomes possible to avoid a problem, such as a droop characteristic that an output of a laser beam varies because of thermal instability.

It is preferable that the illumination light selection member includes a light control mirror switchable to transmit the back light and to reflect the light from the light source with an application of a voltage.

In this case, in a case where information is displayed using the internal light source, because outside light can be shielded, it becomes possible to display a high contrast image. Also, when information is not displayed, the information display device can be used as a transparent window or a mirror. In a mirror state, not only can the information display device provide an effect of preventing a temperature rise in a room by reflecting back light, which is the outside light, but also it can be used as a full-length mirror. Further, the information display device can be used as a light controllable window capable of regulating an amount of outside light entering into the room.

It is preferable that the illumination light selection member includes a light guide plate to which the light from the light source enters from a side surface and from which the light exits from one principal surface, and that the light control mirror is disposed to tilt at a predetermined angle with respect to the one principal surface of the light guide plate.

In this case, even when a diverging ray is injected into the light guide plate, the light control mirror is capable of ejecting light with high directivity in a direction tilted with respect to the principal surface of the light guide plate. Also, when this configuration is combined with a prism sheet, it becomes possible to achieve an information display device capable of displaying output light with high directivity in a predetermined direction. Accordingly, by displaying information efficiently in a particular direction alone, power consumption can be reduced further.

It is preferable that the illumination light selection member includes a tunable filter capable of changing a wavelength to transmit with an application of a voltage.

In this case, the information display device becomes able to display a partially colored image while transmitting the background like stained glass.

It is preferable that the information display device further includes a control portion that controls the tunable filter and the liquid crystal panel so that a color image is displayed by a field sequential method using background light having passed through the tunable filter.

In this case, it becomes possible to perform the field sequential control by making use of back light as outside light. A color display can be thus shown using outside light.

It is preferable that: the light source emits light in aligned polarization; the illumination light selection member includes a polarization reflection sheet that transmits a first polarization component and reflects a second polarization component orthogonal to the first polarization component; and a direction of the second polarization component coincides with a polarization direction of the light emitted from the light source.

In this case, when information is displayed using the internal light source, the first polarization component in the outside light is allowed to pass through as back light. Accordingly, a color image can emerge on a transparent background. The information display device capable of showing such a see-through display is useful as a head up display that shows various displays on the windshield of an automobile or the like.

It is preferable that the light source includes a laser light source that emits a laser beam, and that the illumination light selection member includes a wavelength-selective mirror that selectively reflects light in a vicinity of a wavelength of the laser beam alone.

In this case, too, because an information display device capable of showing a see-through display can be achieved, the information display device is useful as a head up display that shows various displays on the windshield of an automobile or the like.

It is preferable that: the light source emits light in aligned polarization; the illumination light selection member guides the light emitted from the light source to the back surface of the liquid crystal panel while maintaining the polarization; and the liquid crystal panel has a polarization plate on a viewing side alone.

In this case, because a polarization plate on the light-incident side of the liquid crystal panel can be omitted, the cost can be reduced.

It is preferable that the information display device further includes a light control sheet disposed to one of a location between the illumination light selection member and the liquid crystal panel and a location on a viewing side of the liquid crystal panel and switchable to transmit incoming light and to diffuse the incoming light with an application of a voltage.

In this case, it is possible to switch between an image with a narrow view angle and an image with a wide angle. Accordingly, when information is not displayed, the information display device can be used as a window capable of protecting privacy while admitting outside light. Further, it can be used as a light controllable window capable of regulating an amount of outside light entering into a room.

It is preferable that the information display device further includes a prism sheet disposed to one of a location between the illumination light selection member and the liquid crystal panel and a location on a viewing side of the liquid crystal panel and switchable to transmit incoming light and to deflect the incoming light with an application of a voltage.

In this case, in a case where output light exiting from the information display device has directivity, it becomes possible to switch exiting directions of the output light.

It is preferable that the prism sheet includes first and second transparent electrodes having different areas and disposed on a light-incident side and a light-exiting side and electro-optical crystals disposed between the first and second transparent electrodes and having a refractive index that varies with an application of a voltage between the first and second transparent electrodes, and that the electro-optical crystals form a taper-shaped refractive index changed region in a thickness direction to deflect the incoming light when the voltage is applied between the first and second transparent electrodes.

In this case, it becomes possible to achieve a prism sheet capable of instantaneously switching deflection directions.

It is preferable that the illumination light selection member includes a light guide plate to which the light from the light source enters from a side surface and from which the light exits from one principal surface, and a reflection sheet disposed adjacently to an opposing surface of the light guide plate opposing the one principal surface and configured to reflect the light from the light source guided by the light guide plate and to transmit the back light.

In this case, a thin information display device can be achieved.

It is preferable that a deflection groove that deflects incoming light toward the one principal surface is provided to the opposing surface of the light guide plate opposing the one principal surface and a semi-transmissive film that transmits a part of exiting light and returning a rest into the light guide plate is provided to the one principal surface.

In this case, output light substantially perpendicular to the principal surface of the light guide plate can be obtained without using a prism sheet. Accordingly, the configuration can be simpler and the light guide plate can be made further thinner.

It is preferable that: the light source emits light in such a manner that light in aligned polarization enters into the light guide plate; the illumination light selection member includes a light guide plate to which the light from the light source enters from a side surface and from which the light exits from one principal surface; and the light guide plate is formed of a sheet of an optical waveguide that maintains a polarization direction of the light entering from the side surface.

In this case, it becomes possible to achieve an extremely thin and efficient information display device.

It is preferable that the information display device further includes a light receiving portion disposed on an opposing side surface of the light guide plate opposing the side surface from which the light enters therein, and a control portion that controls at least one of the light source and the liquid crystal panel according to a detection signal from the light receiving portion.

In this case, it becomes possible to perform the field sequential control accurately without influences of an environmental change, such as a temperature, and a temporal change. Accordingly, it is possible to display an image at a high image quality with fewer luminance irregularities and color irregularities.

It is preferable that the light source includes a laser light source that emits a laser beam, and that the information display device further includes an optical fiber that transmits the laser beam emitted from the laser light source to the illumination light selection member.

In this case, it is possible to dispose the laser light source generating considerable heat and thereby requiring a heat release mechanism separately from the liquid crystal panel in a place where heat is released readily and to transmit light from the disposed position to the illumination light selection member without a loss in amount of light. An image display portion excluding the light source portion can be thus formed smaller and thinner. Consequently, the degree of freedom in layout of the image display portion can be enhanced. Also, because heat can be released from the laser source sufficiently, the information display device can operate on lower power consumption.

It is preferable that the liquid crystal panel ejects output light with a tilt at a predetermined angle with respect to a direction perpendicular to an output surface of the liquid crystal panel.

In this case, by displaying information efficiently in a particular direction alone, not only can power consumption be reduced, but also the cost can be reduced because no diffusing sheet is necessary.

It is preferable that the liquid crystal panel includes a polarization plate on each of a light-incident side and a light-exiting side and the liquid crystal panel is configured to be normally white.

In this case, when the information display device is applied to a window normally used in a transparent state, because the liquid crystal panel can be turned to transparent while the power supply stays off state, power consumption can be reduced.

It is preferable that the liquid crystal panel includes a color filter that transmits infrared light.

In this case, for example, when the color filter is formed of a dielectric multi-layer film, because the color filter transmits infrared light, it becomes possible to achieve an information display device capable of regulating a temperature inside a room by regulating an amount of infrared light contained in the outside light using the illumination light selection member.

It is preferable that the illumination light selection member is disposed adjacently to a window portion transmitting outside light and transmits the outside light as the back light.

In this case, it becomes possible to achieve a thin information display device that can be fit to a window portion, such as a window or glass for a house and a window or glass for a vehicle, such as an automobile.

An information display device of the invention includes a transparent inorganic EL panel and a light control member disposed to a back surface of the transparent inorganic EL panel and configured in such a manner that back light enters therein from a back surface. The light control member includes at least one of a light control mirror switchable to transmit incoming light and to reflect the incoming light with an application of a voltage, a light control sheet switchable to transmit the incoming light and to diffuse the incoming light with an application of a voltage, and a tunable filer capable of changing a wavelength to transmit with an application of a voltage.

This information display device is able to admit back light from the entire back surface sufficiently as the outside light. Hence, by showing a display using the outside light, not only can power consumption be reduced, but also information can be displayed using a high luminance and high contrast transparent EL inorganic panel. In addition, information can be displayed by the transparent inorganic EL panel on the background like stained glass. Further, because it is possible to show a display by combining a luminescent display by the transparent inorganic EL panel with a transparent, smoke, or mirror portion, a variety of information displays can be achieved.

INDUSTRIAL APPLICABILITY

An information display device of the invention is capable of showing a see-through display that displays a color image in a transparent background. When information is not displayed, it can be switched to be transparent, smoke glass, or a mirror. It can be also used as a light controllable window by admitting outside light at predetermined brightness. The information display device is a thin, low power consuming, and inexpensive information display device with excellent color reproducibility. Accordingly, the information display device is useful because it can be applied to a window for a house and a window for a transportation carriage, such as an automobile.

The invention claimed is:

1. An information display device comprising:
   a light source;
   a liquid crystal panel formed by encapsulating liquid crystals between two base materials; and
   an illumination light selection member disposed in an optical path between the light source and the liquid crystal panel and configured in such a manner that back light enters therein from a back surface,
   wherein the illumination light selection member illuminates a back surface of the liquid crystal panel with at least one of light that is light from the light source reflected on the illumination light selection member and light that is the back light having passed through the illumination light selection member, and
   the illumination light selection member includes a light control mirror switchable to transmit the back light and to reflect the light from the light source with an application of a voltage.

2. The information display device according to claim 1, wherein:
   the liquid crystal panel is formed of a member transparent to the light from the light source and the back light.

3. The information display device according to claim 2, wherein:
   the light source includes at least three light sources that independently emit red light, green light, and blue light; and
   a control portion that controls the three light sources and the liquid crystal panel is further included so that a color image is displayed by a field sequential method.

4. The information display device according to claim 3, wherein:
   the illumination light selection member includes a light guide plate to which the light from the light source enters from a side surface and from which the light exits from one principal surface;
   a light scanning portion that scans the light from the light source along the side surface is further included; and
   the control portion performs the field sequential control by controlling the light sources to emit light continuously and the light scanning portion to scan the red light, the green light, and the blue light emitted from the light sources on different regions of the light guide plate, and by driving the liquid crystal panel according to the regions scanned by the red light, the green light, and the blue light.

5. The information display device according to claim 1, wherein:
   the illumination light selection member includes a light guide plate to which the light from the light source enters from a side surface and from which the light exits from one principal surface; and
   the light control mirror is disposed to tilt at a predetermined angle with respect to the one principal surface of the light guide plate.

6. The information display device according to claim 1, wherein:
   the illumination light selection member includes a tunable filter capable of changing a wavelength to transmit with an application of a voltage.

7. The information display device according to claim 6, further comprising:
   a control portion that controls the tunable filter and the liquid crystal panel so that a color image is displayed by a field sequential method using background light having passed through the tunable filter.

8. The information display device according to claim 1, wherein:
   the light source includes a laser light source that emits a laser beam; and
   the light control mirror is a wavelength-selective mirror that selectively reflects light in a vicinity of a wavelength of the laser beam alone.

9. The information display device according to claim 1, wherein:
   the light source emits light in aligned polarization;
   the illumination light selection member guides the light emitted from the light source to the back surface of the liquid crystal panel while maintaining the polarization; and
   the liquid crystal panel has a polarization plate on a viewing side alone.

10. The information display device according to claim 1, further comprising:
    a light control sheet disposed to one of a location between the illumination light selection member and the liquid crystal panel and a location on a viewing side of the liquid crystal panel and switchable to transmit incoming light and to diffuse the incoming light with an application of a voltage.

11. The information display device according to claim 1, further comprising:
    a prism sheet disposed to one of a location between the illumination light selection member and the liquid crystal panel and a location on a viewing side of the liquid crystal panel and switchable to transmit incoming light and to deflect the incoming light with an application of a voltage.

12. The information display device according to claim 11, wherein:
    the prism sheet includes
    first and second transparent electrodes having different areas and disposed on a light-incident side and a light-exiting side, and
    electro-optical crystals disposed between the first and second transparent electrodes and having a refractive index that varies with an application of a voltage between the first and second transparent electrodes; and
    the electro-optical crystals form a taper-shaped refractive index changed region in a thickness direction to deflect the incoming light when the voltage is applied between the first and second transparent electrodes.

13. The information display device according to claim 1, wherein:
    the liquid crystal panel ejects output light with a tilt at a predetermined angle with respect to a direction perpendicular to an output surface of the liquid crystal panel.

14. The information display device according to claim 1, wherein:
    the liquid crystal panel includes a polarization plate on each of a light-incident side and a light-exiting side and the liquid crystal panel is configured to be normally white.

15. The information display device according to claim 1, wherein:
    the liquid crystal panel includes a color filter that transmits infrared light.

16. The information display device according to claim 1, wherein:
    the illumination light selection member is disposed adjacently to a window portion transmitting outside light and transmits the outside light as the back light.

* * * * *